(12) United States Patent
Ang et al.

(10) Patent No.: US 12,279,206 B2
(45) Date of Patent: Apr. 15, 2025

(54) METHODS AND APPARATUS TO FACILITATE WAKE-UP SIGNALING DURING DISCONTINUOUS RECEPTION

(71) Applicant: QUALCOMM Incorporated, San Diego, CA (US)

(72) Inventors: Peter Pui Lok Ang, San Diego, CA (US); Tingfang Ji, San Diego, CA (US); Wanshi Chen, San Diego, CA (US); Tao Luo, San Diego, CA (US); Alexei Yurievitch Gorokhov, San Diego, CA (US); Aamod Khandekar, San Diego, CA (US); Jafar Mohseni, San Diego, CA (US); Wooseok Nam, San Diego, CA (US); Alexandros Manolakos, San Diego, CA (US); Heechoon Lee, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 16/726,149

(22) Filed: Dec. 23, 2019

(65) Prior Publication Data

US 2020/0221384 A1 Jul. 9, 2020

Related U.S. Application Data

(60) Provisional application No. 62/788,734, filed on Jan. 4, 2019.

(51) Int. Cl.
*H04W 52/02* (2009.01)
*H04L 1/00* (2006.01)
(Continued)

(52) U.S. Cl.
CPC ....... *H04W 52/0229* (2013.01); *H04L 1/0026* (2013.01); *H04L 5/0051* (2013.01);
(Continued)

(58) Field of Classification Search
CPC ........ H04W 52/00; H04W 76/00; H04L 1/00; H04L 5/00; H04L 25/00
See application file for complete search history.

(56) References Cited

U.S. PATENT DOCUMENTS

| 9,642,181 B2 | 5/2017 | Feuersaenger et al. |
| 10,356,839 B2 | 7/2019 | Ang et al. |

(Continued)

FOREIGN PATENT DOCUMENTS

| CN | 112584467 A | 3/2021 |
| JP | 2020519196 A | 6/2020 |

(Continued)

OTHER PUBLICATIONS

CATT: "UE Power Saving Schemes with Power Saving", 3GPP TSG RAN WG1 Meeting #95, R1-1812642, Nov. 12-16, 2018, 10 pages.

(Continued)

*Primary Examiner* — Jamaal Henson
(74) *Attorney, Agent, or Firm* — Procopio, Cory, Hargreaves & Savitch LLP

(57) ABSTRACT

Apparatus, methods, and computer-readable media for providing improved power efficiency during DRX wake-up are disclosed. An example method of wireless communication at a UE includes receiving a WUS from a base station while performing a DRX cycle, the WUS indicating data for transmission to the UE. The example method also includes at least one receiving a downlink reference signal or transmitting an uplink reference signal based on the WUS and prior to reception of the data, the uplink reference signal (Continued)

transmitted or the downlink reference signal received during an on-duration of the DRX cycle and in response to receiving the WUS. The example method also includes sending a CSI report to the base station based on the WUS and prior to the receiving of the data. The example method also includes receiving the data following the respective receiving or transmitting of the downlink reference signal or uplink reference signal.

28 Claims, 23 Drawing Sheets

(51) Int. Cl.
    *H04L 5/00*         (2006.01)
    *H04L 25/02*       (2006.01)
    *H04W 72/23*      (2023.01)
    *H04W 76/28*      (2018.01)

(52) U.S. Cl.
    CPC ........ *H04L 5/0092* (2013.01); *H04L 25/0226* (2013.01); *H04W 72/23* (2023.01); *H04W 76/28* (2018.02)

(56) References Cited

U.S. PATENT DOCUMENTS

| | | | |
|---|---|---|---|
| 10,588,171 | B2 | 3/2020 | Ang et al. |
| 2013/0242778 | A1 | 9/2013 | Geirhofer et al. |
| 2016/0007406 | A1* | 1/2016 | Yi .................. H04W 24/02 370/252 |
| 2017/0034870 | A1* | 2/2017 | Uchino ............ H04W 52/0216 |
| 2018/0097598 | A1 | 4/2018 | Ang et al. |
| 2018/0213482 | A1 | 7/2018 | Dortmund et al. |
| 2018/0279274 | A1 | 9/2018 | Sun et al. |
| 2018/0332533 | A1 | 11/2018 | Bhattad et al. |
| 2019/0053321 | A1 | 2/2019 | Islam et al. |
| 2019/0059056 | A1 | 2/2019 | Islam et al. |
| 2019/0104543 | A1* | 4/2019 | Park .................. H04W 74/006 |
| 2019/0165880 | A1* | 5/2019 | Hakola ............... H04L 1/1854 |
| 2019/0174466 | A1* | 6/2019 | Zhang ................. H04L 5/0057 |
| 2019/0230590 | A1* | 7/2019 | Wu ................... H04W 52/0274 |
| 2019/0239162 | A1* | 8/2019 | Womack ........... H04W 56/0015 |
| 2019/0254110 | A1* | 8/2019 | He .................... H04L 41/0896 |
| 2019/0273637 | A1* | 9/2019 | Zhang ................. H04L 5/0051 |
| 2019/0297514 | A1* | 9/2019 | Pao ...................... H04W 24/08 |
| 2019/0313332 | A1* | 10/2019 | Wu ................... H04W 52/0219 |
| 2020/0037246 | A1* | 1/2020 | Hwang ............. H04W 52/0216 |
| 2020/0037248 | A1 | 1/2020 | Zhou et al. |
| 2020/0092813 | A1* | 3/2020 | Kim ................. H04W 52/0229 |
| 2020/0100197 | A1* | 3/2020 | Pan ................... H04W 72/0446 |
| 2020/0186280 | A1* | 6/2020 | Medles ................ H04L 1/0026 |
| 2022/0078834 | A1* | 3/2022 | Wu ..................... H04L 27/0006 |

FOREIGN PATENT DOCUMENTS

| | | |
|---|---|---|
| TW | 201902249 A | 1/2019 |
| WO | 2016073087 A1 | 5/2016 |
| WO | 2018204799 A1 | 11/2018 |
| WO | 2018208956 A1 | 11/2018 |
| WO | 2018212867 | 11/2018 |
| WO | 2020038546 A1 | 2/2020 |
| WO | 2020041421 A1 | 2/2020 |

OTHER PUBLICATIONS

Spreadtrum Communications: "Discussion on Triggering Adaptation for UE Power Saving", 3GPP TSG RAN WG1 Meeting #95, R1-1813076, Nov. 12-16, 2018, 6 pages.
International Search Report and Written Opinion—PCT/US2019/068494—ISA/EPO—Apr. 21, 2020.
Qualcomm Incorporated: "Triggering Adaptation of UE Power Consumption Characteristics", 3GPP Draft, 3Gpp TSG-RAN WG1 Meeting #95, R1-1813448, Triggering Mechanism for Adaptation, 3rd Generation Partnership Project (3GPP), Mobile Competence Centre, vol. RAN WG1, No. Spokane, Washington, USA; Nov. 12, 2018-Nov. 16, 2018, Nov. 11, 2018 (Nov. 11, 2018), XP051555487, 17 pages, Retrieved from the Internet: URL: http://www.3gpp.org/ftp/Meetings%5F3GPP%5FSYNC/RAN1/Docs/R1%2D1813448%2Ezip [retrieved on Nov. 11, 2018], the whole document.
Taiwan Search Report—TW108147419—TIPO—Jan. 9, 2023.
Fujitsu: "Scheduling and CQI Feedback for URLLC", 3GPP TSG RAN WG1 #87, R1-1611466, Reno, USA, Nov. 14-18, 2016, 7 Pages.
Mediatek Inc: "Triggering Adaptation for UE Power Saving", 3GPP TSG RAN WG1 Meeting #95, R1-1812362, 3rd Generation Partnership Project, Mobile Competence Centre, 650, Route Des Lucioles, F-06921 Sophia-Antipolis Cedex, vol. RAN WG1, No. Spokane, USA, Nov. 12, 2018-Nov. 16, 2018, Nov. 11, 2018, XP051554271, 12 Pages, The whole document.
Qualcomm Incorporated: "PDCCH-Based Power Saving Channel Design", 3GPP TSG-RAN WG1 #97, R1-1907294, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019, XP051728734, 16 Pages, para [2.2.3.1]-para [2.2.3.3], p. 1-15, Sec 2.3.2, Sec 2.1.
Qualcomm Incorporated: "UE Adaptation to The Traffic and UE Power Consumption Characteristics", 3GPP TSG-RAN WG1 Meeting #95, R1-1813447, UE Adaptation For Power Saving, 3rd Generation Partnership Project, Mobile Competence Centre, 650, Route Des Lucioles, F-06921, Sophia-Antipolis Cedex, France, vol. RAN WG1, No. Spokane, Washington, USA, Nov. 12, 2018-Nov. 16, 2018, Nov. 16, 2018, XP051555486, 20 Pages, Section 5.2, Section 4.3.2.
Spreadtrum Communications: "Discussion on PDCCH-based Power Saving Channel", 3GPP TSG RAN WG1 #98b, R1-1910013, Chongqing, China, Oct. 14-20, 2019, 18 Pages.
Vivo: "PDCCH-Based Power Saving Signal/Channel", 3GPP TSG RAN WG1 #97, R1-1906170, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019 May 13, 2019, XP051727624, 10 Page, Section 2.1.2, 2, 1-3, Paragraph 2.1.2.

* cited by examiner

METHODS AND APPARATUS TO FACILITATE WAKE-UP SIGNALING DURING DISCONTINUOUS RECEPTION

CROSS REFERENCE TO RELATED APPLICATION(S)

This application claims the benefit of U.S. Provisional Patent Application Ser. No. 62/788,734, entitled "METHODS AND APPARATUS TO FACILITATE WAKE-UP SIGNALING DURING DISCONTINUOUS RECEPTION" and filed on Jan. 4, 2019, which is expressly incorporated by reference herein in its entirety.

BACKGROUND

Technical Field

The present disclosure relates generally to communication systems, and more particularly, to wireless communication including wake-up signals.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra reliable low latency communications (URLLC). Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Discontinuous reception (DRX) is a cycle in which a User Equipment (UE) may operate in to save power. To achieve DRX, the network and the UE may agree to one or more scheduled durations during which the UE wakes up to look for messages. When operating in accordance with a DRX cycle, a UE may wake-up (e.g., enter an awake state) and actively communicate with a network device, such as a base station, during an on-duration of the DRX cycle, and may enter a sleep state during an off-duration of the DRX cycle. That is, a DRX cycle includes an on-duration during which the UE may monitor for control information (e.g., on a physical downlink shared channel (PDCCH)) and an off-duration during which the UE may power down radio components. In some examples, rather than scheduling when the UE is to implement the on-duration of the DRX cycle, the network device may transit a wake-up signal (WUS) to the UE to transition the UE to the on-duration.

The present disclosure provides unique techniques for improving power efficiency of the DRX cycle. For example, disclosed techniques employ a WUS in relation to other reference signals, such as tracking reference signals (TRSs), channel state information reference signals (CSI-RSs), and/or sounding reference signals (SRSs), to assist in measurement and/or feedback of channel state information. Additional or alternate aspects include implementing a wake-up signal occasion to indicate whether there is data scheduled for the UE in the on-duration of the DRX cycle related to a CSI trigger (e.g., an aperiodic CSI (A-CSI) trigger), an SRS trigger, and/or information related to an active bandwidth part (BWP) of the on-duration of the DRX cycle.

In an aspect of the disclosure, a method, a computer-readable medium, and an apparatus are provided for facilitating wireless communication at a UE. An example apparatus receives a WUS from a base station while performing a DRX cycle, the WUS indicating data for transmission to the UE. The example apparatus also at least one of receives a downlink reference signal or transmits an uplink reference signal based on the WUS and prior to reception of the data, and where the uplink reference signal is transmitted or the downlink reference signal is received during an on-duration of the DRX cycle and in response to receiving the WUS. The example apparatus also sends a CSI report to the base station based on the WUS and prior to the receiving of the data. The example apparatus also receives the data following the receiving of the downlink reference signal or the transmitting of the uplink reference signal. It should be appreciated that aspects of such an example apparatus may be configured to provide techniques for improved power efficiency during DRX wake-up. For example, disclosed techniques may enable utilizing a wake-up window prior to an on-duration of the DRX cycle to improve power efficiency during DRX wake-up by the UE.

In another aspect of the disclosure, a method, a computer-readable medium, and an apparatus are provided for facilitating wireless communication at a base station. An example apparatus transmits a WUS to a UE performing a discontinuous reception DRX cycle, the WUS indicating data for transmission to the UE. The example apparatus also at least one of receives an uplink reference signal or transmits a downlink reference signal based on the WUS and prior to transmission of the data, and where the downlink reference signal is transmitted or the uplink reference signal is received during an on-duration of the DRX cycle and after receipt of the WUS at the UE. The example apparatus also receives a CSI report from the UE based on the WUS and prior to the transmission of the data. The example apparatus also transmits the data following the receiving of the uplink reference signal or the transmitting of the downlink reference signal. It should be appreciated that aspects of such an example apparatus may be configured to provide techniques for improved power efficiency during DRX wake-up by, for example, enabling a UE to utilize a wake-up window prior to an on-duration of a DRX cycle of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
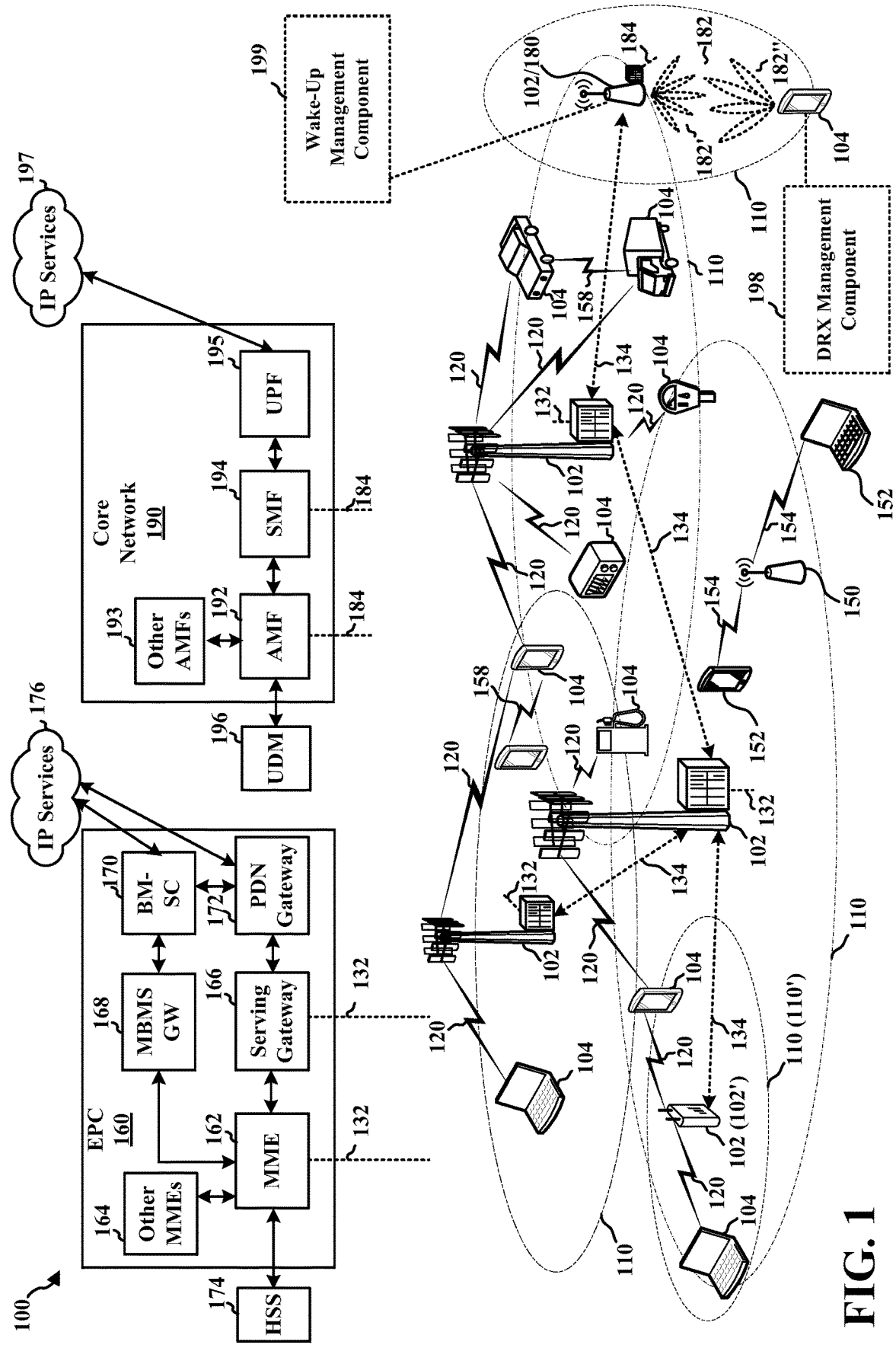
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly over backhaul links 134 (e.g., X2 interface) or indirectly (e.g., through the EPC 160 or the core network 190) with each other. The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a macrocell (e.g., a macro base station), may include an eNB, gNodeB (gNB), or another type of base station. Some base stations 180, such as a gNB, may operate in a traditional sub 6 GHz spectrum, in millimeter wave (mmW) frequencies, and/or near mmW frequencies in communication with the UE 104. When the gNB operates in mmW or near mmW frequencies, the gNB may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station, such as the base station 180, may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication while the UE 104 is operating in a DRX cycle. For example, the UE 104 of FIG. 1 includes a DRX management component 198 configured to receive a WUS from a base station while performing a DRX cycle, the WUS indicating data for transmission to the UE. The example DRX management component 198 may also be configured to at least one of receive a downlink reference signal or transmit an uplink reference signal based on the WUS and prior to reception of the data, and where the uplink reference signal is transmitted or the downlink reference signal is received during an on-duration of the DRX cycle and in response to receiving the WUS. The example DRX management component 198 may also be configured to send a CSI report to the base station based on the WUS and prior to the receiving of the data. The example DRX management component 198 may also be configured to receive the data following the receiving of the downlink reference signal or the transmitting of the uplink reference signal.

Referring still to FIG. 1, in certain aspects, the base station 180 may be configured to facilitate one or more aspects of wireless communication while the UE 104 is operating in the DRX cycle. For example, the base station 180 of FIG. 1 includes a wake-up management component 199 configured to transmit a WUS to a UE performing a DRX cycle, the WUS indicating data for transmission to the UE. The example wake-up management component 199 may also be configured to receive an uplink reference signal or transmit a downlink reference signal based on the WUS and prior to transmission of the data, and where the downlink reference signal is transmitted or the uplink reference signal is received during an on-duration of the DRX cycle and after receipt of the WUS at the UE. The example wake-up management component 199 may also be configured to receive a CSI report from the UE based on the WUS and prior to the transmission of the data. The example wake-up management component 199 may also be configured to transmit the data following the receiving of the uplink reference signal or the transmitting of the downlink reference signal.

Although the following description may be focused on 5G/NR, the concepts described herein may be applicable to other similar areas, such as LTE, LTE-A, CDMA, GSM, and/or other wireless technologies, in which a UE may operate in a DRX cycle.

Figure 2:
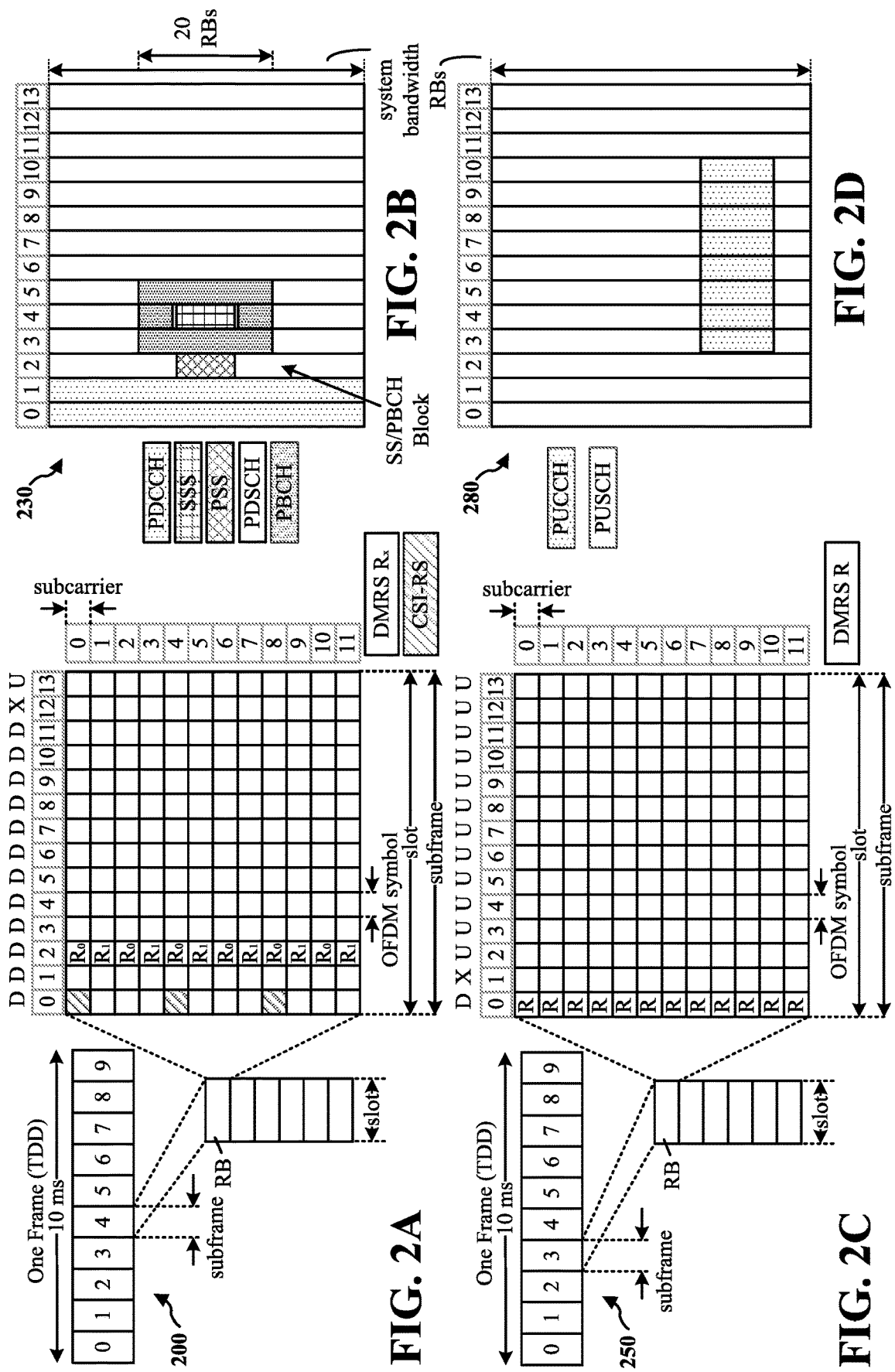
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies II. 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A to 2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
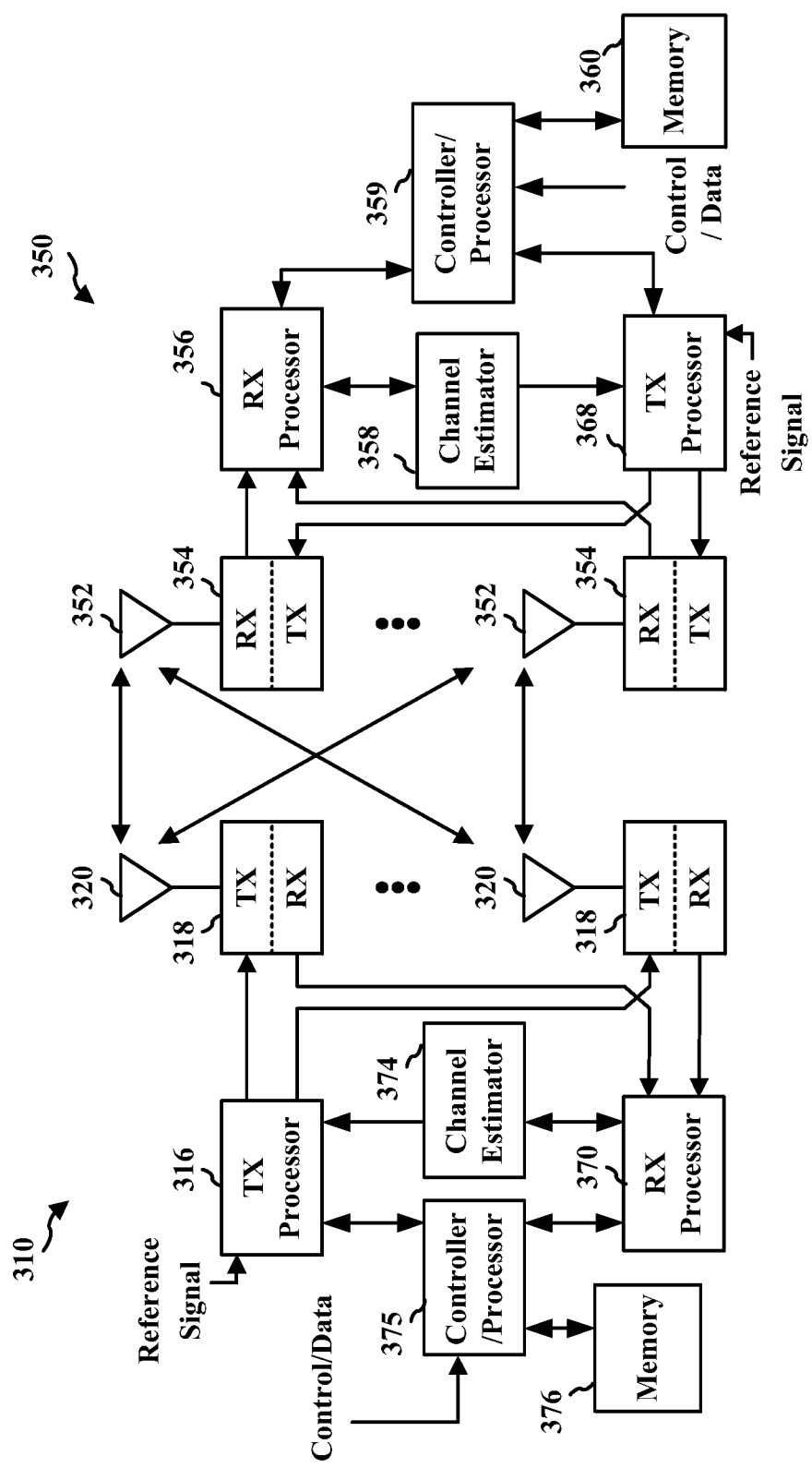
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 of the UE 350 may be configured to perform aspects in connection with the DRX management component 198 of FIG. 1.

At least one of the TX processor 316, the RX processor 370, and the controller/processor 375 may be configured to perform aspects in connection with the wake-up management component 199 of FIG. 1.

A UE may operate in accordance with a DRX cycle to save power. When operating in accordance with a DRX cycle (sometimes referred to as operating in a "DRX mode"), a UE may wake-up and actively communicate with a network device (e.g., a base station) during an on-duration of the DRX cycle, and may enter a sleep state during an off-duration of the DRX cycle. In some examples, wake-up signaling may be beneficial for a UE to implement power saving techniques as the UE does not continuously operate in an on-duration. For enhanced mobile broadband (EMBB) applications and devices (e.g., smartphones), connected mode DRX (C-DRX) is a beneficial power management technique for applying wake-up signaling. In some examples, a wake-up signal (WUS) can be based on a control channel (e.g., on PDCCH) and/or a reference signal (e.g., CSI-RS). Tracking reference signals (TRSs) are types of CSI-RS.

However, for relatively long DRX cycles, a UE may perform a warm-up procedure that enables tracking loops, performing measurements of and/or reporting of CSI, performing beam management, etc. in order to ensure that the UE and the base station have a good link performance. For example, while in a long DRX cycle, a beam that was used for communication by the UE before the UE entered the long DRX cycle may be blocked or less reliable and may need to be updated. Thus, it may be beneficial for the WUS to consider reference signals for DRX warm-up procedures.

In some aspects, wake-up signaling during a DRX cycle may employ bandwidth part (BWP) adaptation. For example, a first BWP configuration may be a low power or narrow bandwidth and a second BWP configuration may be a wide bandwidth. In some such examples, the first BWP configuration may facilitate wake-up signaling while the second BWP configuration may facilitate data transfer. For example, when the UE wakes up and is in the on-duration of a DRX cycle, the UE may be configured in the first BWP configuration, thus, saving power by not operating in a wide bandwidth. When the UE detects a WUS during the on-duration, the UE may transition to the second BWP configuration to enable data transfer. In some examples, time domain radio access tables may be configured such that minimum offsets may be provided to enable the UE to transition from the first BWP configuration to the second BWP configuration. In some examples, if data is not received while the UE is operating in the second BWP configuration and a DRX inactivity timer (or counter) expires, the UE may transition to the off-duration of the DRX cycle. In some examples, CSI, such as an aperiodic CSI (A-CSI), can be triggered after the UE transitions to the second BWP configuration as cross-BWP triggering of A-CSI from the first BWP configuration to the second BWP configuration may not be permitted.

However, in some such examples, data transmissions that occur after the UE transitions to the second BWP configuration (e.g., via a physical downlink shared channel (PDSCH)) may be based on previous channel quality indicators (CQIs) as the CSI may not be triggered until the UE is operating in the second BWP configuration (e.g., the CQI may be old or "stale"). Additionally, PDCCH demodulation/decoding may be based on previous frequency, time, channel, and/or beam tracking metrics. Furthermore, to conserve power, in some examples, the on-duration may be configured to be a relatively short duration. However, in some such examples, in order for the UE to perform any BWP configuration switching (or transitioning), the UE may be triggered by scheduling downlink control information (DCI) during the on-duration, which may reduce the base station's scheduling flexibility.

Figure 4:
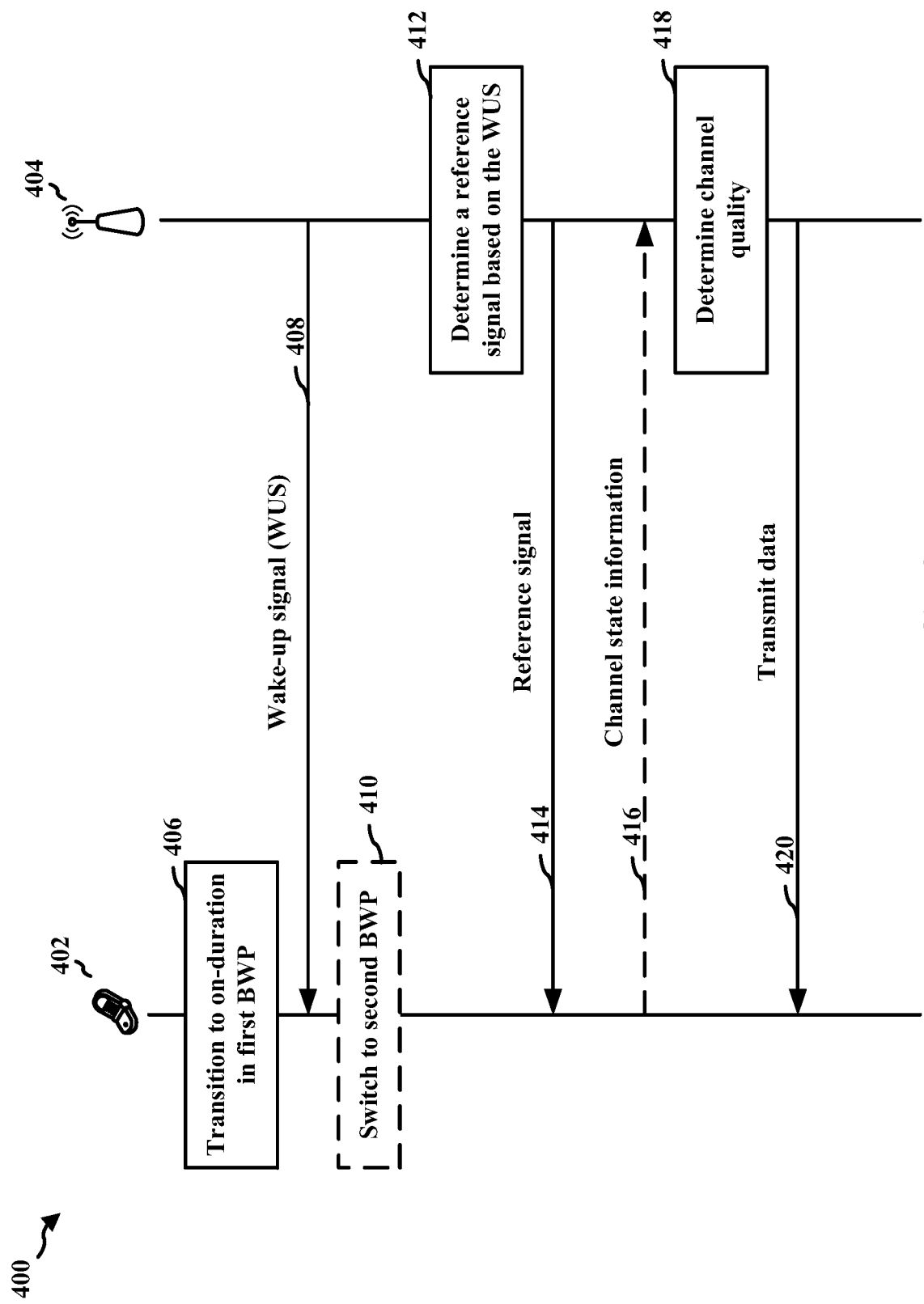
FIG. 4 is a diagram illustrating a call flow diagram between a base station and a UE when the UE employs wake-up signaling during an on-duration of a DRX cycle, as disclosed herein.

FIG. 4 is a diagram illustrating a call flow diagram 400 between a UE 402 and a base station 404 when the UE is operating in a DRX cycle. One or more aspects of the UE 402 may be implemented by the UE 104 of FIG. 1 and/or the UE 350 of FIG. 3. One or more aspects of the base station 404 may be implemented by the base station 102/180 of FIG. 1 and/or the base station 310 of FIG. 3. In the illustrated example of FIG. 4, the DRX cycle includes an on-duration and an off-duration.

At 406, the UE 402 transitions to the on-duration of the DRX cycle (e.g., from the off-duration of the DRX cycle). In the illustrated example, the UE 402 operates in a first bandwidth part (BWP) configuration associated with a low power or narrow bandwidth. While the UE 402 is operating during the on-duration of the DRX cycle, the UE 402 receives a wake-up signal (WUS) 408 from the base station 404. The WUS 408 may indicate that there is data for transmission to the UE 402 (e.g., from the base station 404). In some examples, the WUS 408 may be an uplink grant. In some examples, the WUS 408 may be a downlink assignment without corresponding downlink data.

At 410, the UE 402 may switch to a second BWP configuration associated with a high power or wide bandwidth. For example, the power corresponding to the second BWP configuration may be relatively higher than the power corresponding to the first BWP configuration and/or the bandwidth corresponding to the second BWP configuration may be relatively wider than the bandwidth corresponding to the first BWP configuration. In some examples, the UE 402 may switch to operating in the second BWP configuration from the first BWP configuration in response to the received WUS 408 (e.g., the receiving of the WUS 408 by the UE 402 may trigger the UE 402 to switch BWP configuration).

At 412, the base station 404 determines a reference signal based on the WUS 408. The base station 404 then transmits a reference signal 414 to the UE 402. In some examples, the UE 402 may transmit information 416, such as a CSI report, to the base station 404 in response to the reference signal 414 (or after receipt of the reference signal 414). For example, the reference signal 414 may be an aperiodic channel state information reference signal (A-CSI-RS) sent using the second BWP. In some such examples, the UE 402 may transmit a CSI report to the base station 404 based on the receipt of the reference signal 414 (e.g., the A-CSI-RS).

At 418, the base station 404 determines channel quality for transmitting data to the UE 402. For example, the base station 404 may identify a channel quality indicator (CQI) included in the information 416 (e.g., the CSI report) transmitted by the UE 402 and received by the base station 404. The base station 404 may then schedule and transmit data 420 to the UE 402 based at least in part on the determined channel quality.

In the illustrated example of FIG. 4, the base station 404 determines the reference signal 414 based at least in part on the WUS 408 and the base station 404 transmits the determined reference signal 414 to the UE 402. In additional or alternative examples, the UE 402 may determine a reference signal to transmit to the base station 404 based on the received WUS 408 and then transmit the determined reference signal to the base station 404. For example, based on the received WUS 408, the UE 402 may transmit a sounding reference signal (SRS) to the base station 404. As described above, the base station 404 may use the SRS for channel quality estimation to enable resource scheduling on the uplink, link adaptation, massive MIMO, and/or beam management. In some such examples in which the UE 402 transmits the SRS to the base station 404 based on the WUS 408, the base station 404 may estimate channel quality based on the SRS and may then schedule and transmit the data 420 to the UE 402 based on the estimated channel quality. Thus, it should be appreciated that in some such examples in which the UE 402 transmits the information 416 to the base station 404 based on the WUS 408, the base station 404 may not transmit the reference signal 414 to the UE 402 and the UE 402 may not transmit the information 416 (e.g., a CSI report) to the base station 404.

In various aspects, the base station 404 may provide a reference signal trigger for the corresponding reference signal to the UE 402. In some examples, the reference signal trigger may be an indication to use a preconfigured reference signal resource. In some examples, the reference signal trigger may be an indication to select which configuration of the resource to use, for example, in instances where the resource is associated with multiple configurations. In some such examples, the reference signal trigger may facilitate reception of the corresponding reference signal within a same slot as the reference signal trigger. For example, the base station 404 may transmit a CSI-RS trigger to facilitate reception of a CSI-RS within a same slot as the CSI-RS trigger. In some examples, the reference signal trigger and the corresponding reference signal may be received after the UE 402 switches to the second BWP configuration (e.g., transitions from the first BWP configuration to the second BWP configuration). So that the switch from the first BWP configuration to the second BWP configuration does not affect reception of the reference signal trigger, the base station 404 may transmit the reference signal trigger (e.g., the CSI-RS trigger) after a slot offset sufficient to enable the UE 402 to complete the performing of the BWP configuration switch.

In some examples, the base station 404 may transmit a CSI-RS trigger to the UE 402 to facilitate reception of a CSI-RS in a different slot as the CSI-RS trigger. In some such examples, the reference signal trigger may be transmitted by the base station 404 to the UE 402 after a slot offset sufficient to enable the UE 402 to complete the performing of the BWP configuration switch. The base station 404 may also transmit the CSI-RS spaced apart from the CSI-RS trigger by at least a CSI trigger offset.

Figure 5:
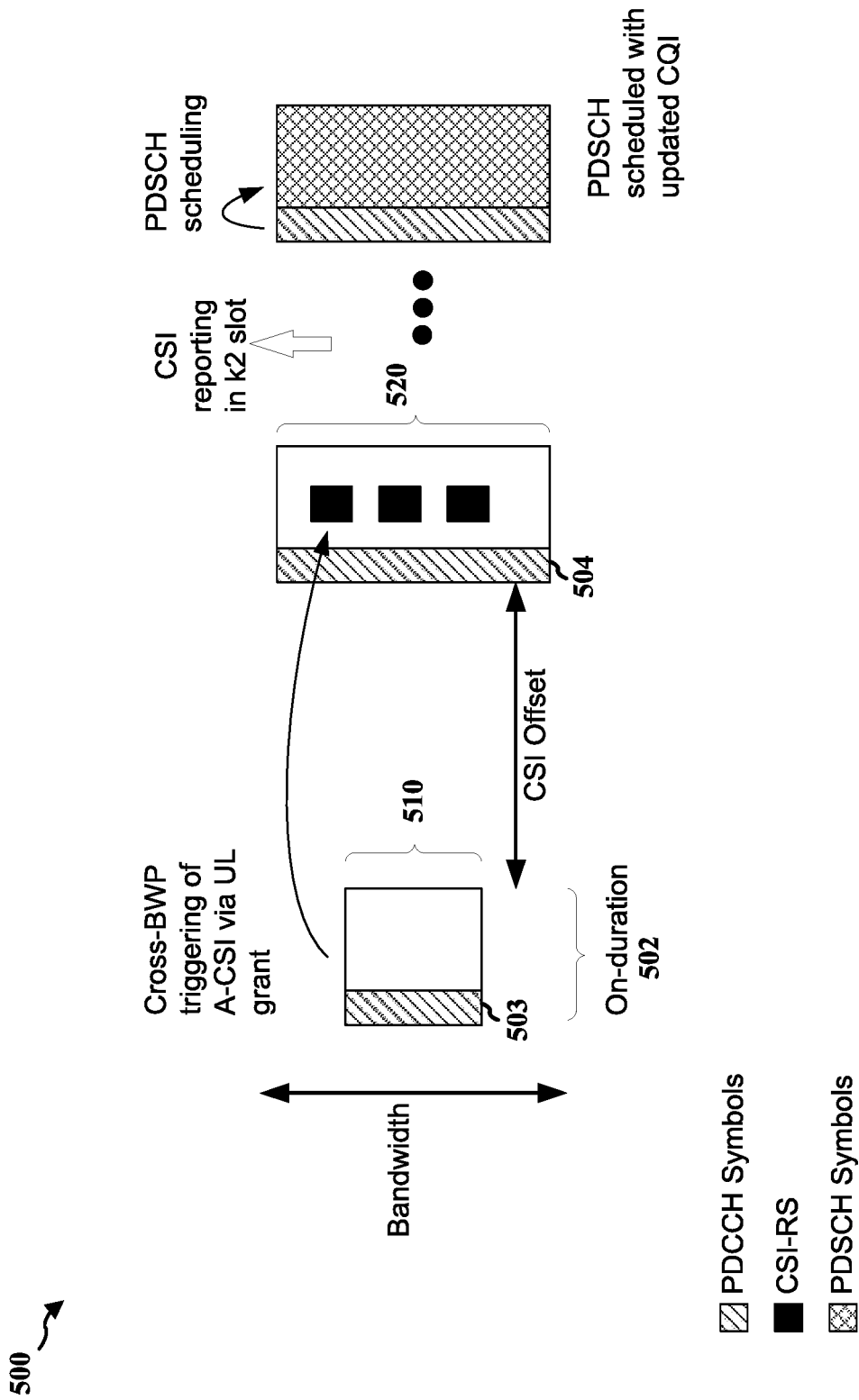
FIGS. 5 to 9 illustrate flow diagrams employing wake-up signaling during an on-duration of respective DRX cycles, as disclosed herein.

FIG. 5 is a flow diagram 500 illustrating example aspects of applying wake-up signaling during a period 502 of a DRX cycle. In the illustrated example, the period 502 is the on-duration of the DRX cycle. However, in other examples, the period 502 may correspond to a preconfigured period containing wake-up signal monitoring occasion(s). In FIG. 5, the UE is configured to start in a first BWP configuration (e.g., the low power or narrow bandwidth) at the beginning of an on-duration of the DRX cycle. In addition, the example of FIG. 5 supports cross-BWP triggering of A-CSI. For example, the UE and the base station may support switching BWP configurations without scheduling data transfer.

In the illustrated example, while the UE is in the period 502 of the DRX cycle, the UE may operate in a first BWP configuration 510. The UE of the illustrated example also receives cross-BWP triggering of A-CSI 503 via an uplink grant while operating in the first BWP configuration 510. The UE then transitions to a second BWP configuration 520 (e.g., a wide bandwidth) to support data transfer (as shown at 410 of FIG. 4). In the illustrated example, a CSI offset is applied between the on-duration 502 and a PDCCH 504 to enable the UE to transition from the first BWP configuration 510 to the second BWP configuration 520. Once the UE is operating in the second BWP configuration 520, a base station may transmit a CSI-RS to the UE (e.g., the reference signal 414 of FIG. 4), resulting in the UE providing a CSI report to the base station (e.g., the CSI report 416 of FIG. 4). In the illustrated example, the UE provides a CSI report in a k2 slot. The UE and the base station then schedule PDSCH using any updated CQI provided in the CSI reports. Thus, in this illustrated example, the CSI-RS may be transmitted prior to the transmission of data. By using a CSI offset with a non-zero duration, the example wake-up signaling illustrated in FIG. 5 satisfies quasi co-location (QCL) type D requirements (e.g., spatial Rx parameters associated with analog beam switching) in case of potential analog beam switching time.

Figure 6:
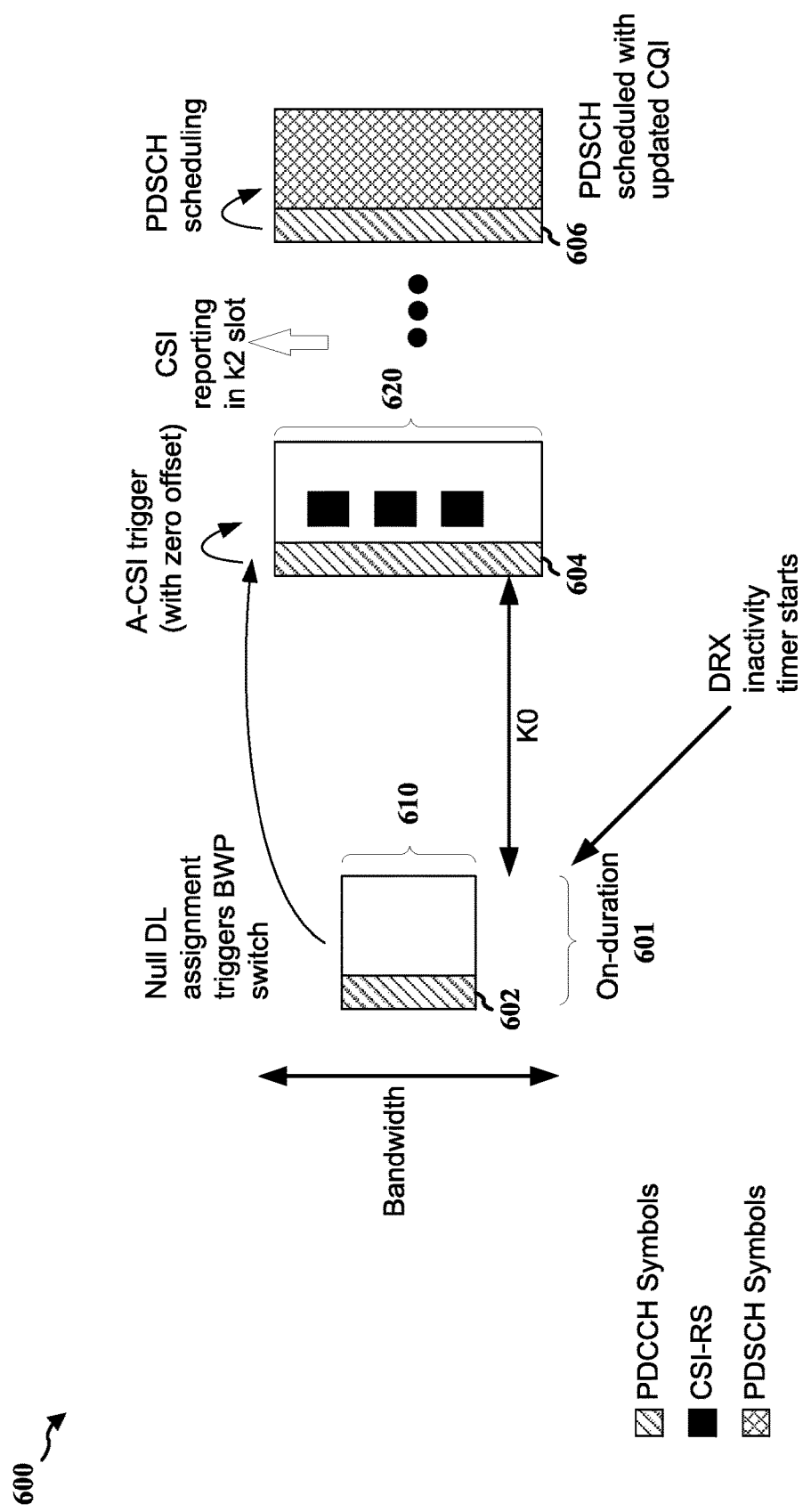

FIG. 6 is a flow diagram 600 illustrating additional example aspects of applying wake-up signaling during a period 601 of a DRX cycle. In the illustrated example, the period 601 is the on-duration of the DRX cycle. However, in other examples, the period 601 may correspond to a preconfigured period containing wake-up signal monitoring occasion(s). Similar to the example of FIG. 5, in FIG. 6, the UE may be configured to start in a first BWP configuration 610 (e.g., the low power or narrow bandwidth) at the beginning of the on-duration of the DRX cycle.

In the illustrated example of FIG. 6, while the UE is operating in the period 601 of the DRX cycle, the UE may operate in the first BWP configuration 610. The UE also receives a null DL assignment DCI 602 to trigger a BWP configuration switch (e.g., without actually scheduling data). After a slot offset (K0), the UE is configured to operate in a second BWP configuration 620. While operating in the second BWP configuration 620, the UE may receive a A-CSI trigger 604 followed by CSI-RS. Similar to the example in FIG. 5, the transmitting of the trigger via the control channel (e.g., at 604) may trigger the CSI-RS without scheduling data. In some examples, PDCCH 606 may schedule data following the receipt of a CSI report from the UE. In this illustrated example, the UE provides the CSI report in the k2 slot. The UE and the base station then schedule PDSCH using any updated CQI provided in the CSI reports. In some examples, there might be no CSI offset.

Figure 7:
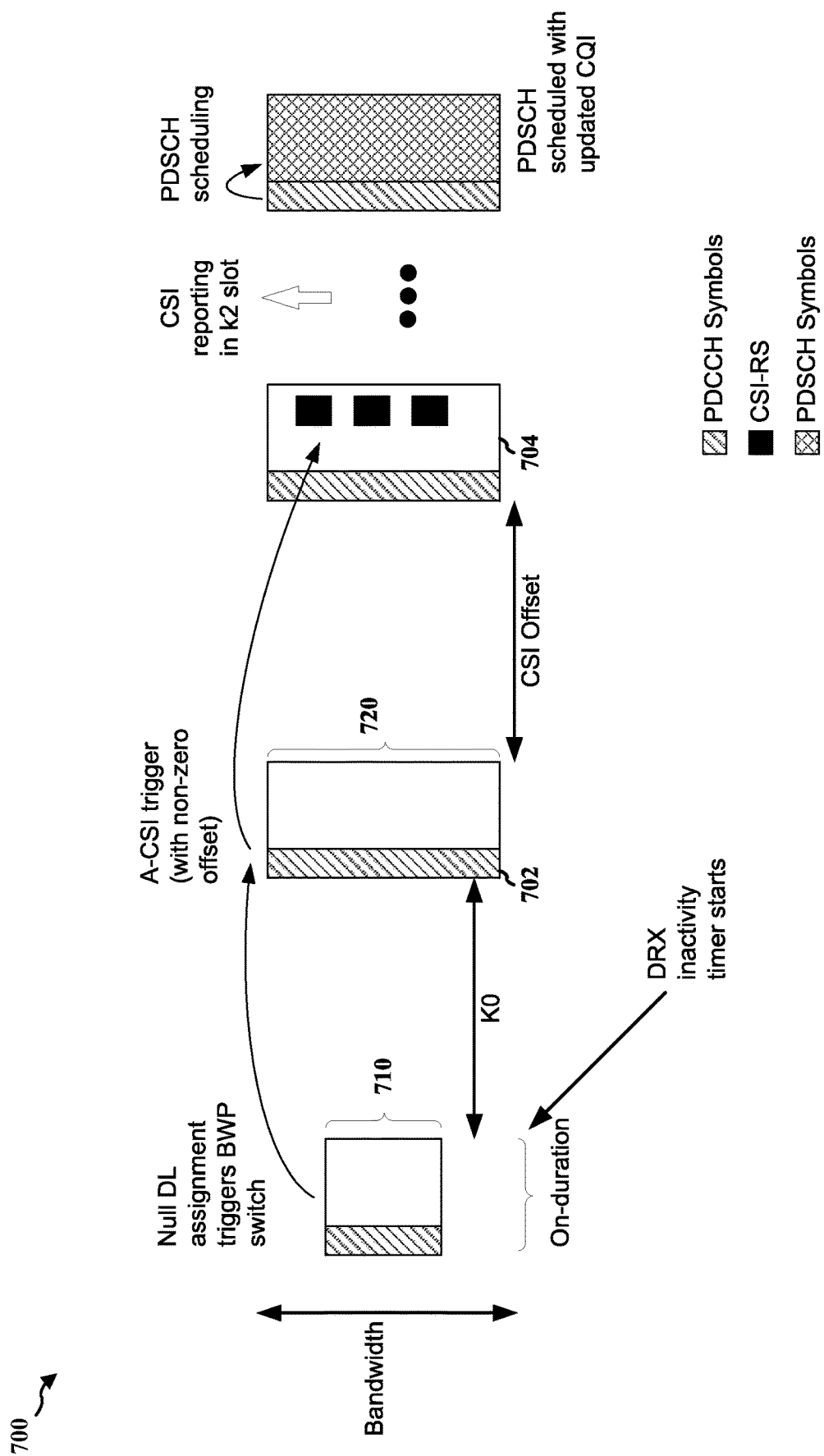

If a CSI offset has a non-zero duration, then the overall timeline may be delayed, as shown in example flow diagram 700 of FIG. 7. In the illustrated example, the CSI offset has a non-zero duration, which introduces an additional delay. For example, a first slot offset delay (K0) is provided to enable the UE to transition from a first BWP configuration 710 to a second BWP configuration 720, and a CSI offset delay is provided between a A-CSI trigger 702 and the communicating of a A-CSI-RS 704. In the illustrated example of FIG. 7, the null DL assignment is received during a period 701 corresponding an on-duration of a DRX cycle. However, in other examples, the period 701 may correspond to a preconfigured period containing wake-up signal monitoring occasion(s).

Figure 8:
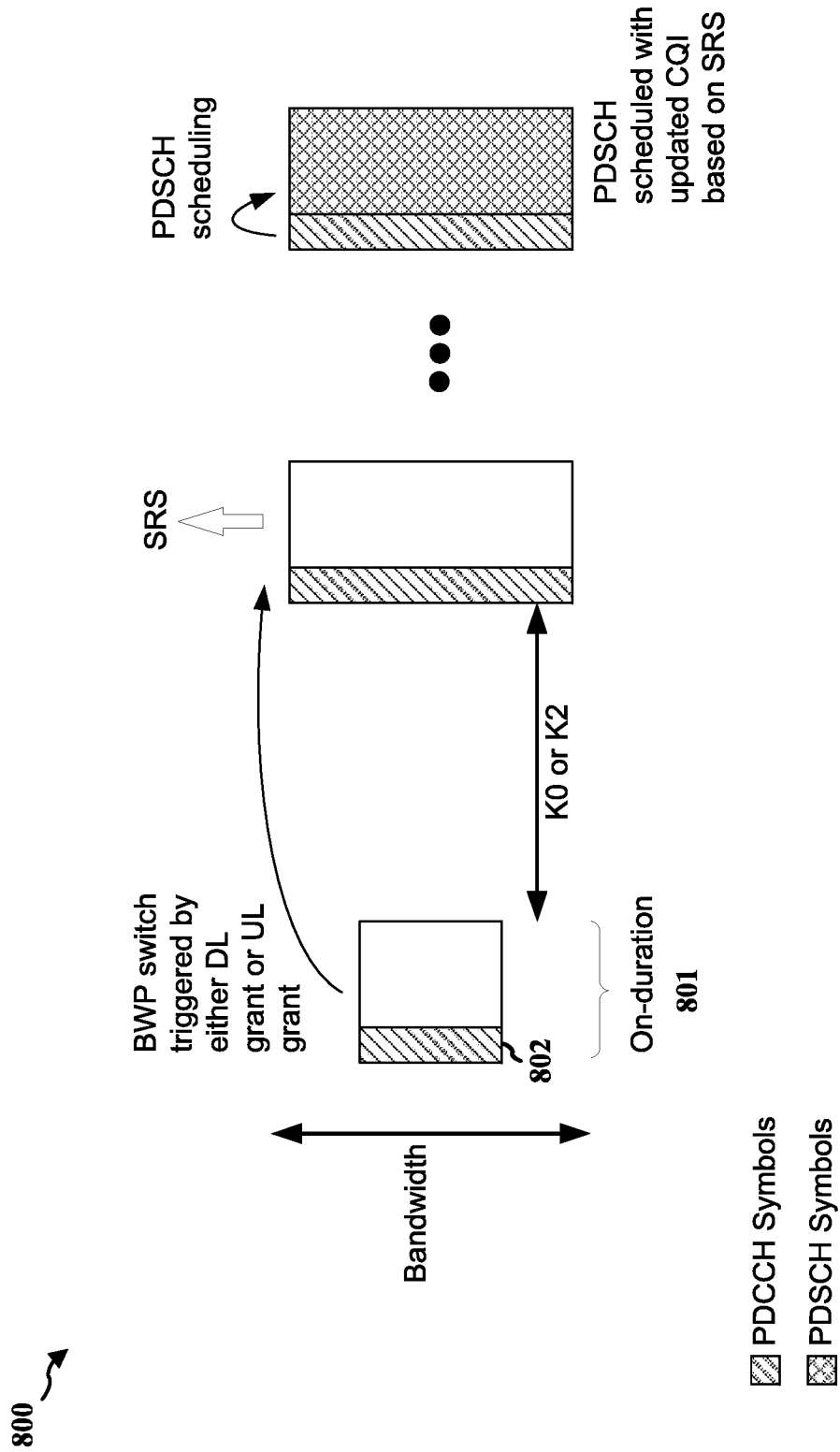
Figure 9:
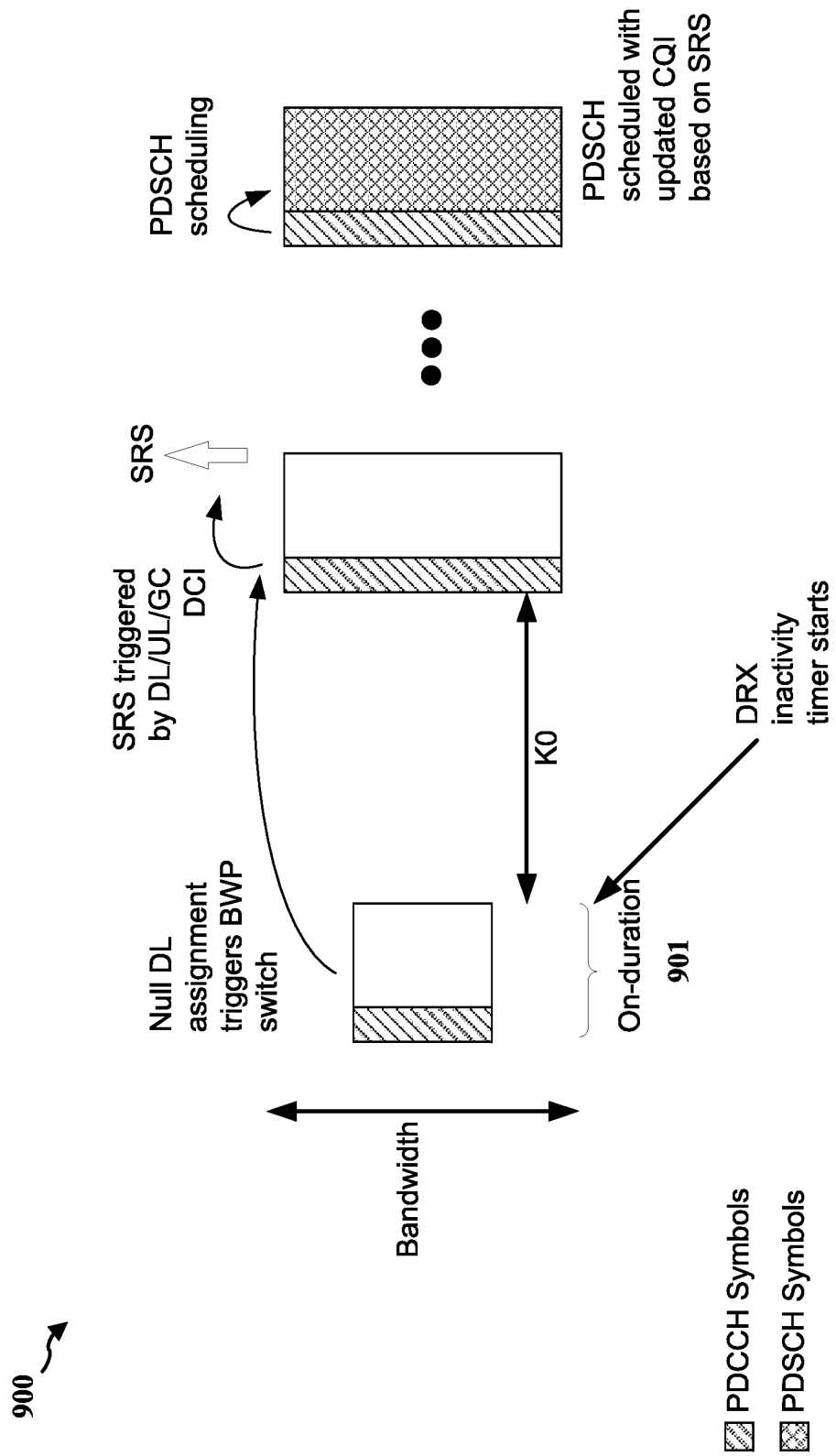

FIGS. 8 and 9 are flow diagrams 800 and 900, respectively, illustrating additional example aspects of applying wake-up signaling during an on-duration of a DRX cycle. In the examples of FIGS. 8 and 9, instead of communicating A-CSI to obtain CSI reports, the WUS may cause the UE to transmit an aperiodic sounding reference signal (A-SRS) to provide channel quality information.

In the illustrated example of FIG. 8, the SRS transmission from the UE is triggered in response to a downlink grant or an uplink grant 802 received during a period 801 of the DRX cycle. In the illustrated example, the period 801 is the on-duration of the DRX cycle. However, in other examples, the period 801 may correspond to a preconfigured period containing wake-up signal monitoring occasion(s). Additionally, the SRS may be transmitted after a slot offset delay that accommodates BWP transition latency. For example, for a BWP configuration switch triggered by a DL grant, the slot offset delay may be K0, and for a BWP configuration switch triggered by an UL grant, the slot offset delay may be K2. As used herein, the terms "K2" or "K2 offset" (or variants thereof) refers to the number of slots from the slot where the uplink grant is received to the slow where the scheduled PUSCH transmission starts. The UE and the base station may then schedule PDSCH using channel quality estimated based on the SRS.

In the illustrated example of FIG. 9, the UE receives a null downlink assignment that triggers the BWP configuration switch during a period 901, similar to the example in FIG. 6. In the illustrated example, the period 901 is the on-duration of the DRX cycle. However, in other examples, the period 901 may correspond to a preconfigured period containing wake-up signal monitoring occasion(s). After the UE transitions from a first BWP configuration to a second BWP configuration (and after the slot offset delay (K0)), an SRS transmission may be triggered by a downlink grant, an uplink grant, or group common DCI. As used herein, the term "K0," "K2 offset," or "slot offset delay" (or variants thereof) refers to the number of slots from the slot where the downlink grant is received, to the slot where the scheduled PDSCH reception starts. The UE and the base station may then schedule PDSCH using channel quality estimated based on the SRS. In the illustrated example, there is no SRS offset. In some examples, TRS may also be communicated to enable loop tracking prior to the communicating of the SRS to improve time/frequency accuracy that may be used for data transmissions.

In some examples, it may be beneficial to modify the DRX cycle. For example, a modified DRX cycle may include a wake-up signal occasion (sometimes referred to as a "pre-wake-up window" (PWU)), an on-duration, and an off-duration. In the modified DRX cycle, the on-duration may be relatively longer than the on-duration of the non-modified DRX cycle. Furthermore, in some examples, a low power or narrow bandwidth may be associated with the wake-up signal occasion and if no wake-up signal is received during the wake-up signal occasion, the UE can conserve power by transitioning to the off-duration rather than to the on-duration until the next wake-up signal occasion. As used herein, the terms "wake-up signal occasion," "pre-wake-up window" and "wake-up window prior to the on-duration" are used interchangeably.

Figure 10:
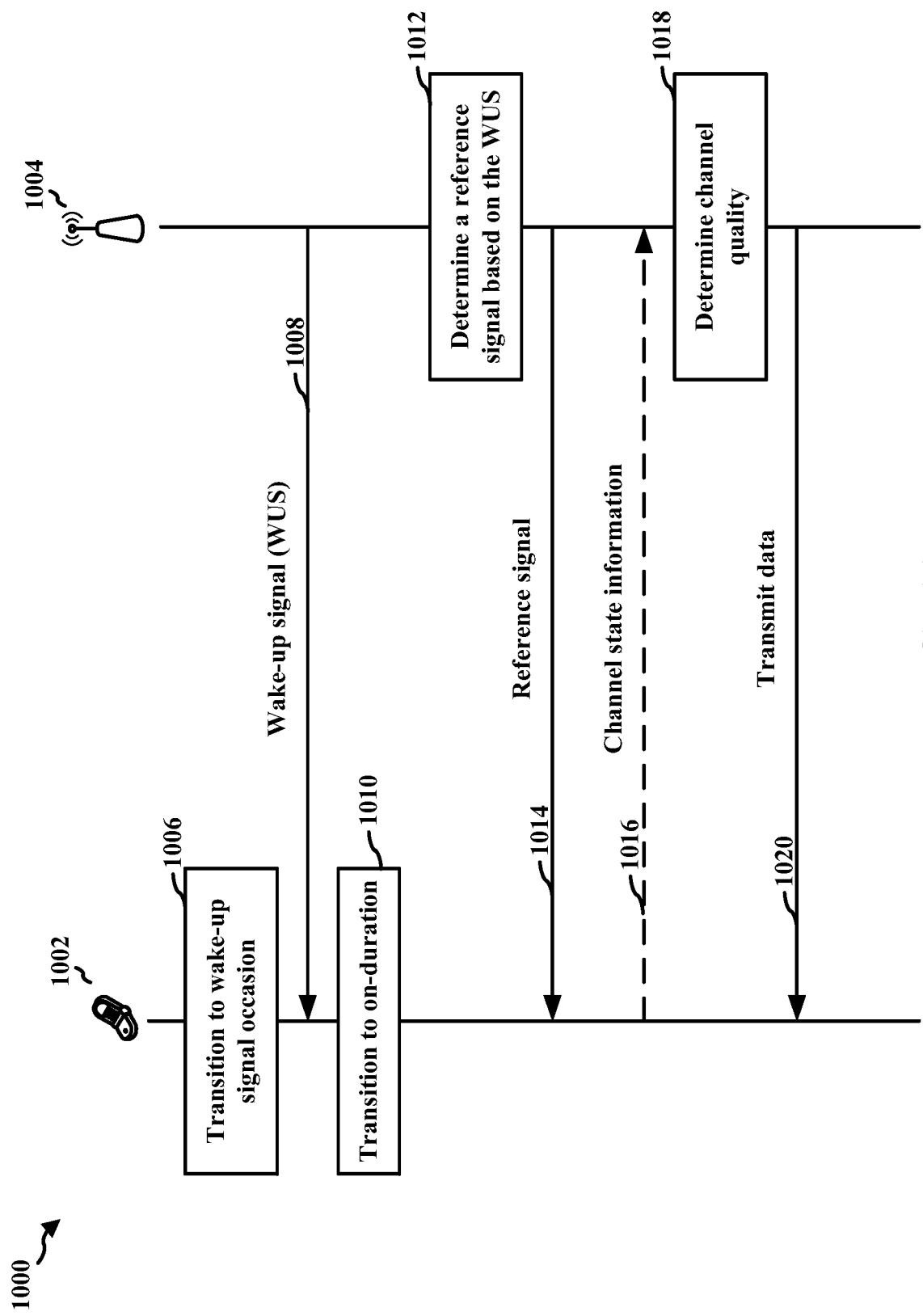
FIG. 10 is a diagram illustrating a call flow diagram between a base station and a UE when the UE employs wake-up signaling during a wake-up signal occasion of a DRX cycle, as disclosed herein.

FIG. 10 is a diagram illustrating a call flow diagram 1000 between a UE 1002 and a base station 1004 when the UE is operating in a DRX cycle. One or more aspects of the UE 1002 may be implemented by the UE 104 of FIG. 1, the UE 350 of FIG. 3, and/or the UE 402 of FIG. 4. One or more aspects of the base station 1004 may be implemented by the base station 102 of FIG. 1, the base station 310 of FIG. 3, and/or the base station 404 of FIG. 4. In the illustrated example of FIG. 10, the DRX cycle includes a wake-up signal occasion, an on-duration, and an off-duration (e.g., a modified DRX cycle).

At 1006, the UE 1002 transitions to the wake-up signal occasion of the DRX cycle (e.g., from the off-duration). While the UE 1002 is operating in the wake-up signal occasion of the DRX cycle, the UE 1002 receives a wake-up signal (WUS) 1008 from the base station 1004. In some examples, the WUS 1008 may indicate that there is data for transmission to the UE 1002 (e.g., from the base station 1004). The WUS 1008 may be part of a control channel or another reference signal. In some examples, the WUS 1008 may be a PDCCH (sometimes referred to herein as a "PDCCH-WUS"). In some such examples, the PDCCH-WUS may be configured to enable the use of relatively compact downlink control information (DCI), use of a special radio network temporary identifier (RNTI), facilitate a reduced search-space, and/or facilitate blind decoding. In some examples, the PDCCH-WUS may be received in a single control resource set (CORESET). In some examples, the PDCCH-WUS may be received in multiple CORESETs (e.g., to improve robustness and/or redundancy of the WUS).

In some examples, the WUS 1008 may be a periodic tracking resource signal (P-TRS) (sometimes referred to herein as a "P-TRS-WUS"). In some such examples, the detection scheme for the P-TRS-WUS may be configured to provide robustness. For example, a detection scheme for detecting the P-TRS-WUS may be configured with a P-TRS-WUS mis-detection probability that is relatively low because if the P-TRS-WUS is undetected (e.g., by the UE 1002), then the UE may not transition to the on-duration and a cycle for scheduling and transmitting data may be missed.

At 1010, the UE 1002 transitions to the on-duration of the DRX cycle from the wake-up signal occasion. In some examples, the power associated with the on-duration may be the same or relatively higher than the power associated with the wake-up signal occasion and/or the bandwidth associated with the on-duration may be the same or relatively wider than the bandwidth associated with the wake-up signal occasion. In some examples, the UE 1002 may transition to the on-duration of the DRX cycle in response to the received WUS 1008 (e.g., the receiving of the WUS 1008 may cause the UE 1002 to transition from the wake-up signal occasion to the on-duration).

At 1012, the base station 1004 determines a reference signal based on the WUS 1008. The base station 1004 then transmits a reference signal 1014 to the UE 1002. In some examples, the UE 1002 may transmit information 1016, such as a CSI report, to the base station 1004 based on the reference signal 1014 (or after receipt of the reference signal 1014). For example, the reference signal 1014 may be an A-CSI-RS. In some such examples, the UE 1002 may transmit a CSI report to the base station 1004 after receiving the A-CSI-RS.

At 1018, the base station 1004 determines channel quality for transmitting data to the UE 1002. For example, the base station 1004 may identify a CQI included in the CSI report transmitted by the UE 1002 and received by the base station 1004. The base station 1004 then schedules and transmits data 1020 to the UE 1002 based at least in part on the determined channel quality.

In the illustrated example of FIG. 10, the base station 1004 determines, at 1012, a reference signal based on the WUS and transmits the determined reference signal (e.g., the reference signal 1014) to the UE 1002. In additional or alternative examples, the UE 1002 may determine a reference signal based on the received WUS 1008 and the UE 1002 may then transmit the determined reference signal to the base station 1004. For example, based on the received WUS 1008, the UE 1002 may transmit an SRS to the base station 1004. As described above, the base station 1004 may use the SRS for channel quality estimation to enable resource scheduling on the uplink, link adaptation, massive MIMO, and/or beam management. In some such examples in which the UE 1002 transmits the SRS to the base station 1004, the base station 1004 may estimate, at 1018, channel quality based on the SRS and may then schedule and transmit the data 1020 to the UE 1002 based on the estimated channel quality. Thus, it should be appreciated that in some such examples in which the UE 1002 transmits the SRS to the base station 1004 based on the WUS 1008, the base station 1004 may not transmit the reference signal 1014 to the UE 1002 and the UE 1002 may not transmit information 1016 (e.g., a CSI report) to the base station 404.

In various aspects, the UE 1002 may use a same BWP configuration when operating in the wake-up signal occasion and when operating in the on-duration of the modified DRX cycle. For example, the WUS that is received during the wake-up signal occasion may be received on a same BWP as a reference signal that is received or transmitted during the on-duration. In other examples, the wake-up signal occasion may have a preconfigured BWP configuration that is different than the BWP configuration associated with the on-duration of the modified DRX cycle. For example, the preconfigured BWP configuration associated with the wake-up signal occasion may have a relatively narrower bandwidth than the BWP configuration associated with the on-duration of the modified DRX cycle. In some such examples, there may be an implicit BWP transition between the wake-up signal occasion and the on-duration of the modified DRX cycle. In other examples, the WUS received during the wake-up signal occasion may include information identifying which BWP to use for the on-duration of the modified DRX cycle. For example, the WUS may indicate a wider BWP when there is a relatively large amount of data to be scheduled and transmitted from the base station. In some such examples, using a PDCCH-WUS may be beneficial for indicating the wider BWP.

In various aspects, the base station 1004 may transmit a P-TRS before or after the PDCCH-WUS (e.g., for synchronizing timing). For example, P-TRS may be transmitted during the wake-up signal occasion (e.g., before or after the PDCCH-WUS) for tracking loop updates and/or facilitating beam management.

In various aspects, the base station 1004 may provide a reference signal trigger for the corresponding reference signal to the UE 1002. In some examples, the reference signal trigger may be an indication to use a preconfigured reference signal resource. In some examples, the reference signal trigger may be an indication to select which configuration of the resource to use, for example, in instances where the resource is associated with multiple configurations. In some examples, the reference signal trigger may facilitate reception of the corresponding reference signal within a same slot as the reference signal trigger.

FIGS. 11 to 15 are flow diagrams illustrating example aspects of applying wake-up signaling during a wake-up signal occasion of a DRX cycle. In these examples, the wake-up signal occasion occurs prior to the on-duration of the DRX cycle. The wake-up signal occasion is a relatively short window, which enables the on-duration to be a relatively longer window. Furthermore, specialized wake-up signals (WUS) enable reducing the overall bandwidth during the wake-up signal occasion. For example, the WUS may be a control channel (e.g., PDCCH) or a reference signal (e.g., P-TRS).

Figure 11:
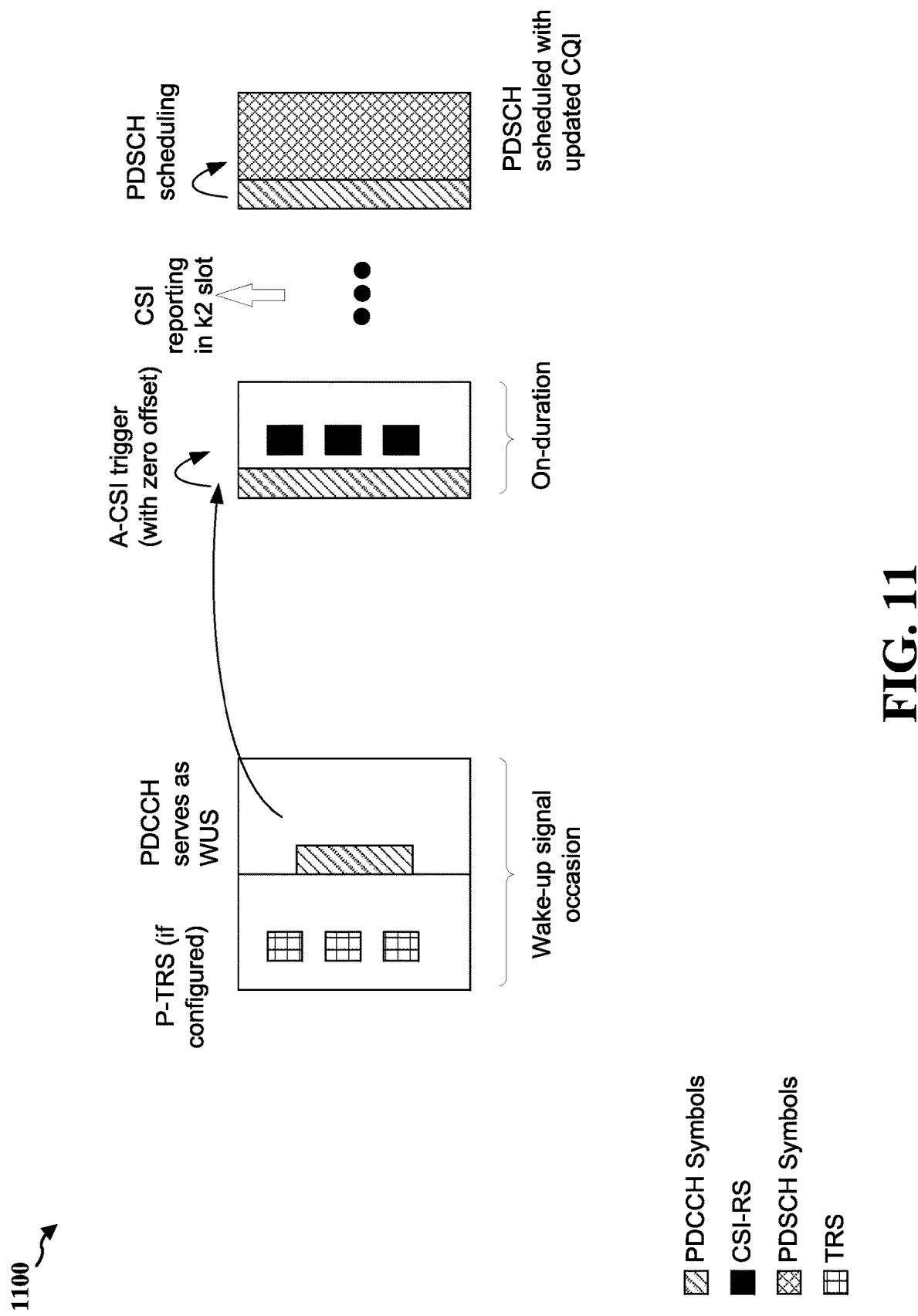
FIGS. 11 to 15 illustrate flow diagrams employing wake-up signaling during a wake-up signal occasion of respective DRX cycles, as disclosed herein.

FIG. 11 is a flow diagram 1100 illustrating an example in which the PDCCH functions as the WUS (e.g., a PDCCH-WUS). In the illustrated example, the PDCCH-WUS is received during a wake-up signal occasion. The PDCCH-WUS may be configured to facilitate a compact DCI, facilitate a special RNTI, facilitate a reduced search-space, facilitate blind-decoding, etc. In the illustrated example, after receiving the PDCCH-WUS, the UE may transition to the on-duration and an A-CSI may be triggered with a zero duration offset (e.g., the CSI-RS are communicated during the same slot). In the illustrated example, the UE provides the CSI reports in a k2 slot. The UE and the base station may then schedule PDSCH using any updated CQI provided in the CSI reports.

In the illustrated example, P-TRS may also be transmitted during the wake-up signal occasion. The P-TRS may enable tracking loop updates and facilitate beam management. While the P-TRS are shown in FIG. 11 as being transmitted before the PDCCH-WUS, in other examples, the P-TRS may be transmitted after the PDCCH-WUS. In some examples, instead of P-TRS, the UE and the base station may use PDCCH demodulation reference signals (DMRS) for updating timing (e.g., to perform timing synchronization). In some examples, the P-TRS communicated during the wake-up signal occasion might not be used for the WUS.

Figure 12:
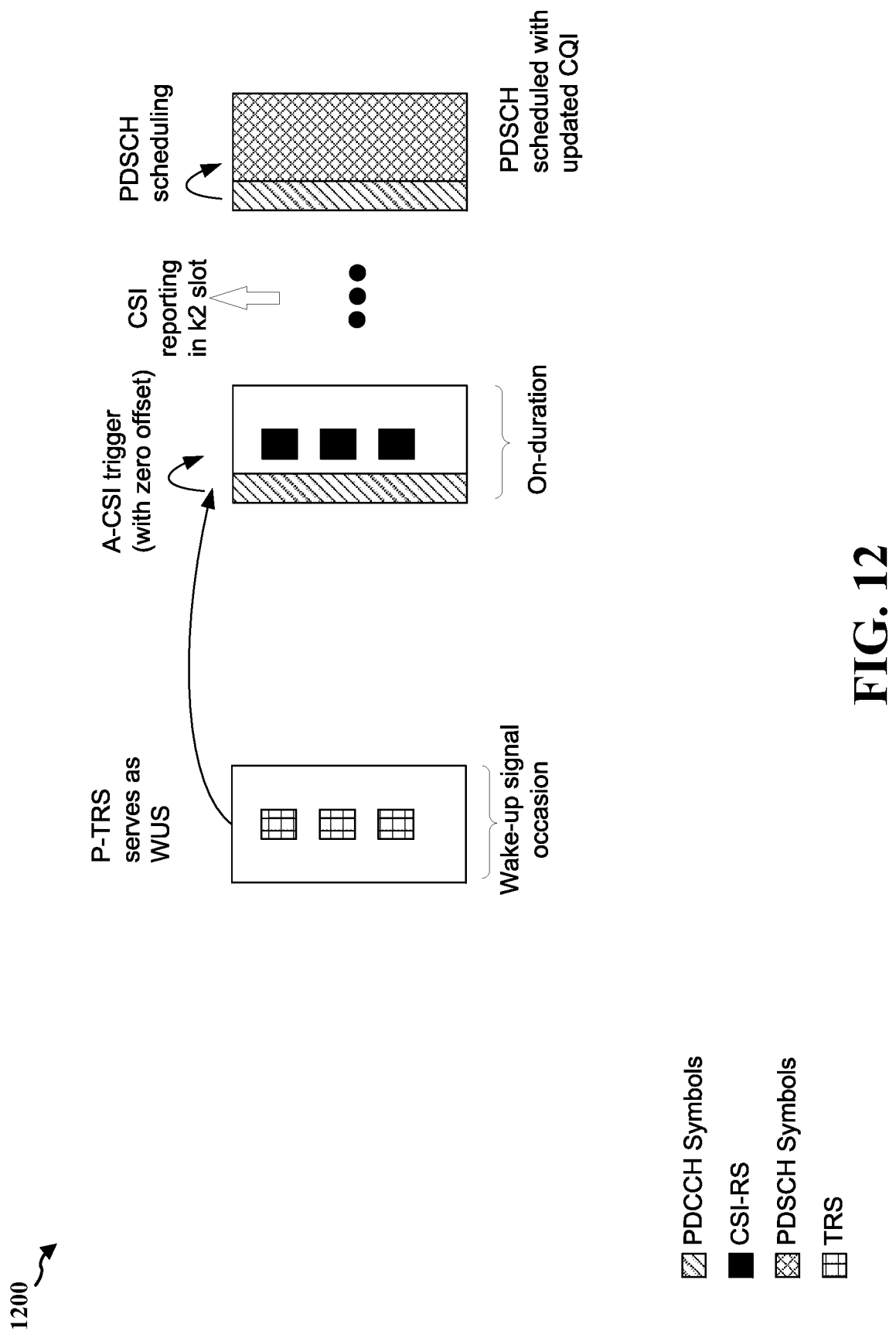

In the example flow diagram 1200 of FIG. 12, the P-TRS are communicated during the wake-up signal occasion and are used for the WUS (e.g., P-TRS-WUS). In the illustrated example, in response to the P-TRS-WUS, the UE transitions from the wake-up signal occasion to the on-duration. In some such examples, CSI (e.g., A-CSI) may then be triggered with a zero duration offset (e.g., the CSI-RS are communicated during the same slot). In the illustrated example, the UE provides the CSI reports in a k2 slot. The UE and the base station may then schedule PDSCH using any updated CQI provided in the CSI reports. In the illustrated example, the CSI may be triggered with a zero duration offset. In other examples, the CSI may be triggered with a non-zero offset. In some such examples, an additional delay be added.

Figure 13:
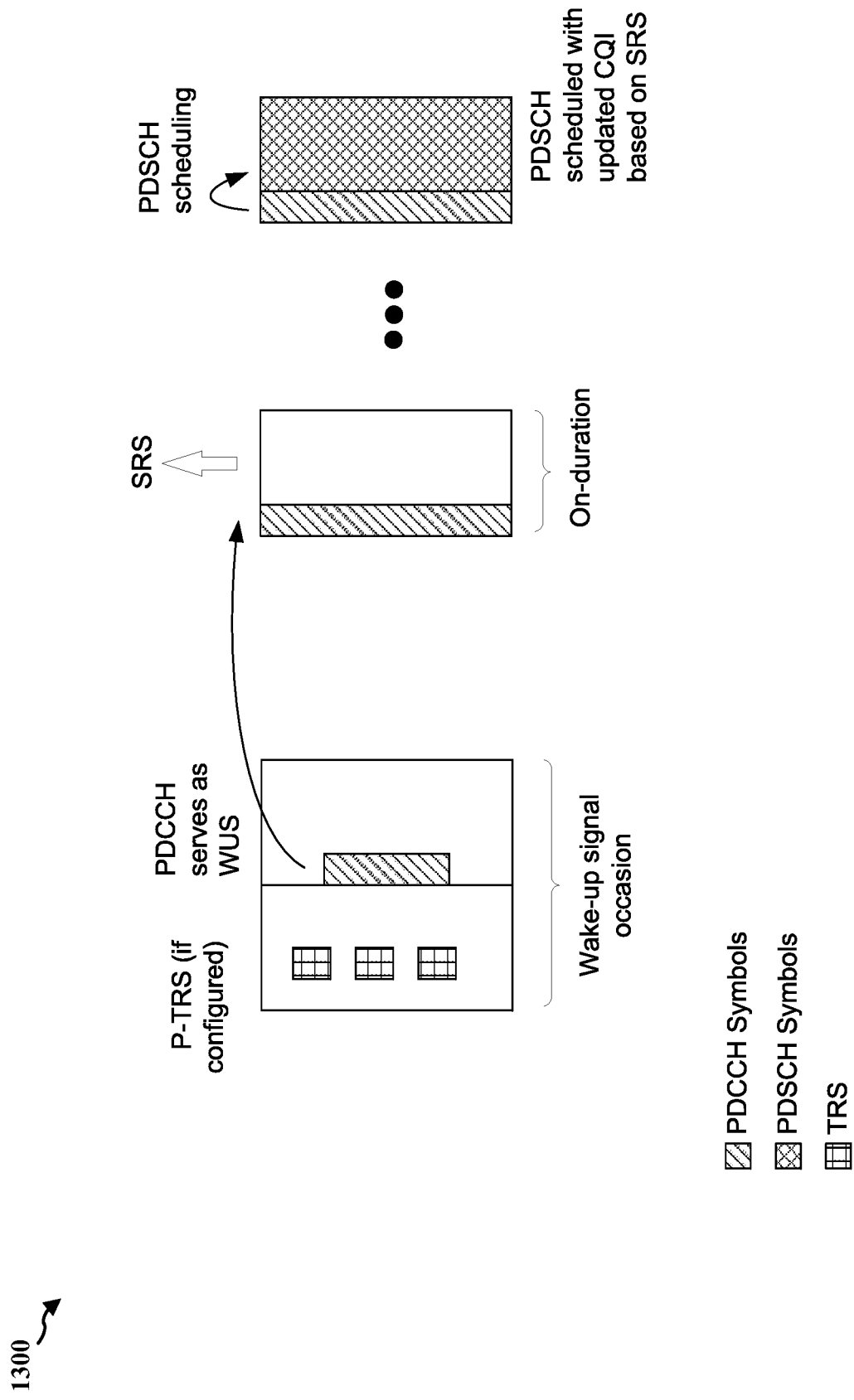

FIG. 13 is a flow diagram 1300 similar to the flow diagram 1100 of FIG. 11, in which P-TRS and PDCCH-WUS are received by the UE during the wake-up signal occasion. However, in FIG. 13, SRS are triggered instead of A-CSI. In the illustrated example, the SRS may be triggered either directly by the WUS, or indirectly as part of a DRX warm-up procedure.

Figure 14:
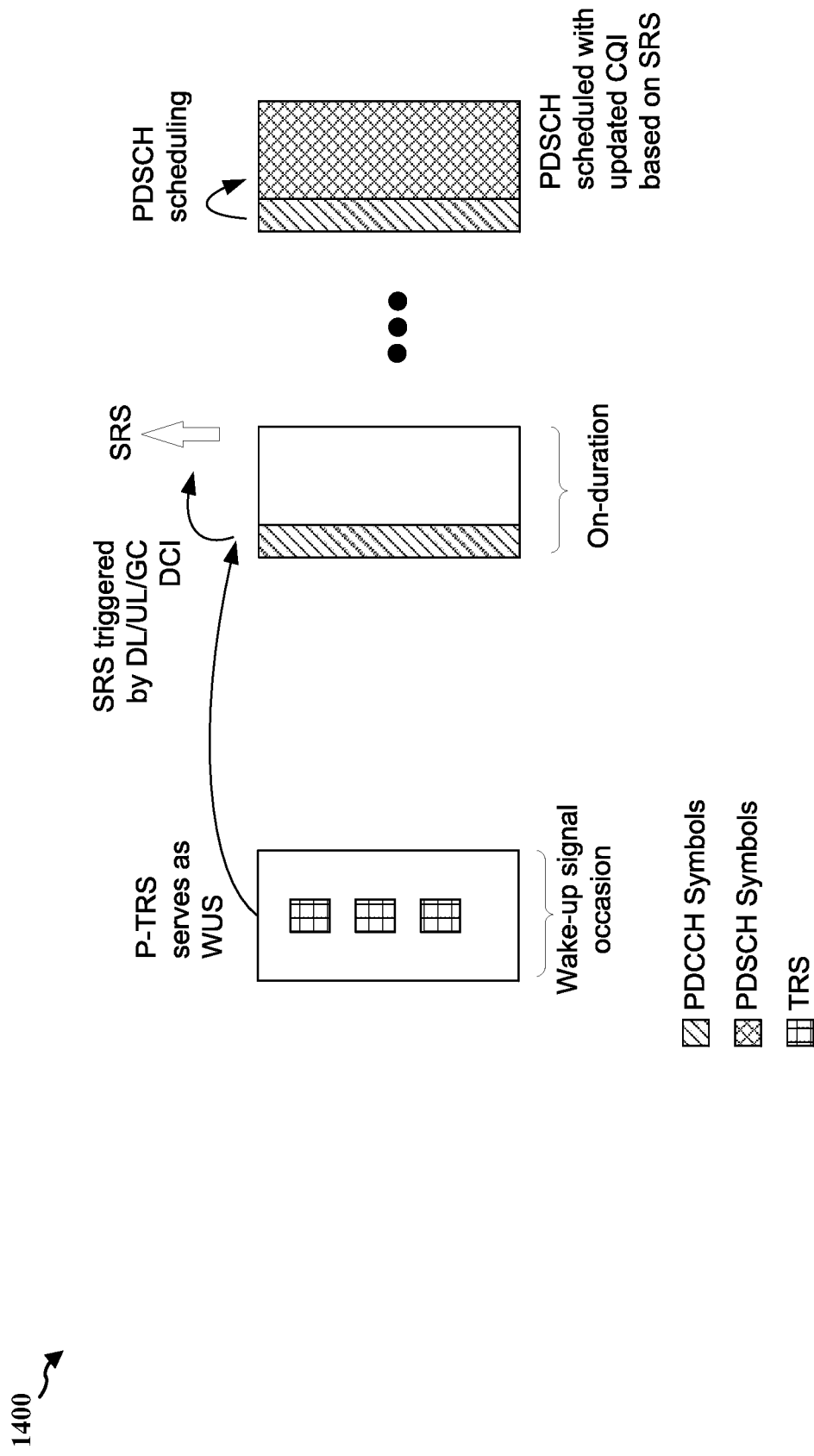

FIG. 14 is a flow diagram 1400 similar to the flow diagram 1200 of FIG. 12, in which the P-TRS serves as the WUS during the wake-up signal occasion. However, in FIG. 14, SRS are triggered instead of A-CSI. In the illustrated example, the SRS may be triggered either directly by the WUS, or indirectly as part of a DRX warm-up procedure.

In some examples, the wake-up signal occasion may use the same BWP as the active BWP for the on-duration. In some examples, the bandwidth of the WUS can be smaller than the active BWP, and further RF bandwidth reduction can be applied for power savings.

In some examples, the wake-up signal occasion may have a preconfigured BWP that may be different than the active BWP for the on-duration. In some such examples, there may be an implicit BWP transition between the wake-up signal occasion and the on-duration.

In some examples, the WUS can indicate the active BWP for the on-duration. For example, the WUS may indicate a wider BWP, if, for example, there is a large amount of data to be scheduled. Thus, in some examples, the BWP configuration may be selected based on the amount of data to be communicated. In some examples, a PDCCH based WUS (e.g., a PDCCH-WUS) may be used to indicate the BWP configuration for the on-duration.

Figure 15:
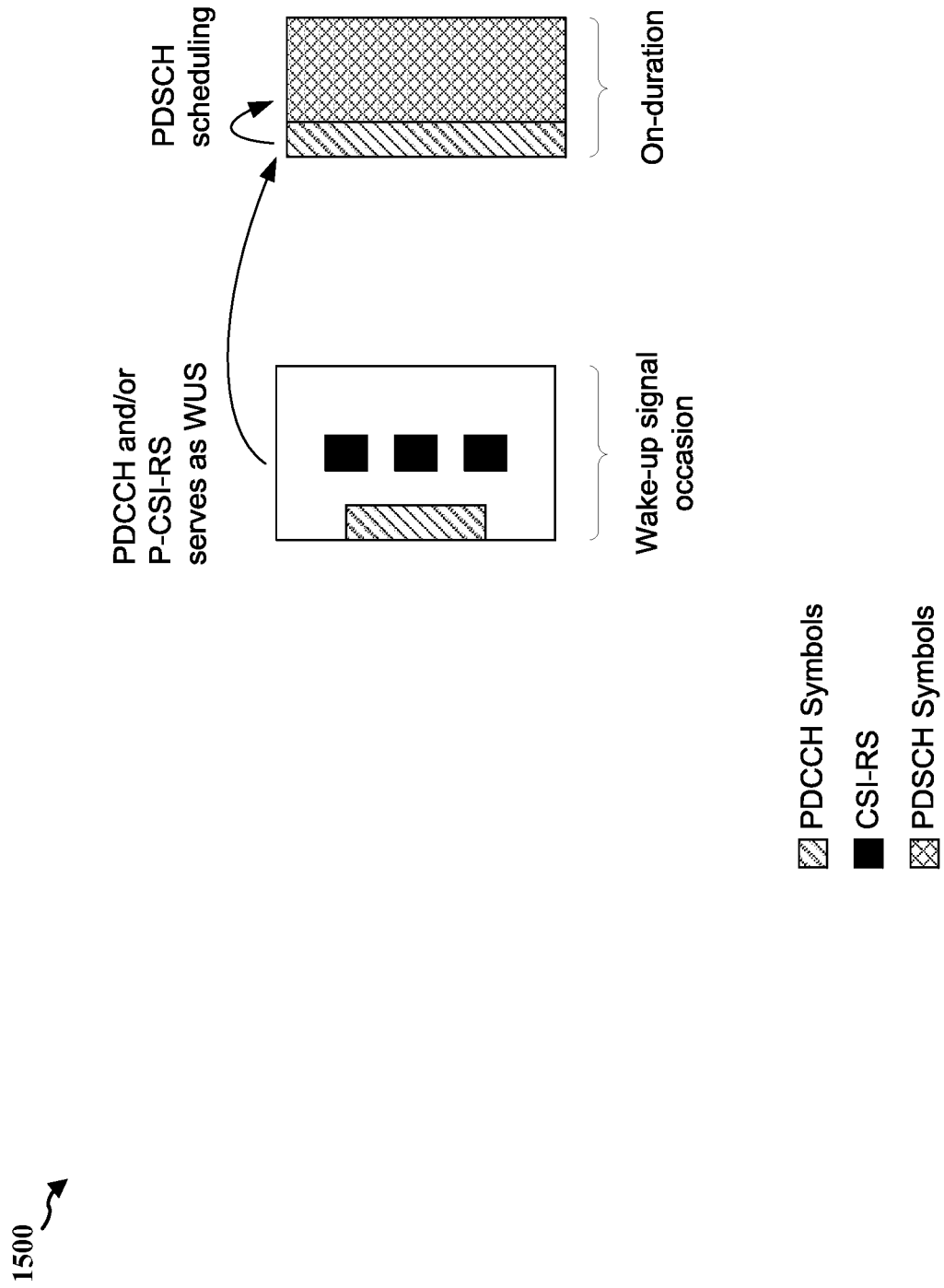

FIG. 15 is a flow diagram 1500 in which the PDCCH and/or periodic CSI-RS (P-CSI-RS) functions as the WUS received during the wake-up signal occasion. In the illustrated example, transmitting the PDCCH and the P-CSI-RS during the wake-up signal occasion may reduce latency. Furthermore, the number of reception chains may not be reduced. For example, P-CSI-RS may be configured to provide reference signals for data transmission, which may be a full rank transmission. If a data transmission is full rank, the reference signal(s) for the data may also be full rank, which may result in the number of reception chains for the P-CSI-RS not being reduced. Transmitting the PDCCH and the P-CSI-RS during the wake-up signal occasion may increase bandwidth requirements, though. Thus, in some examples, aspects of FIG. 15 may be employed for devices without a need for a bandwidth limitation during the wake-up signal occasion. The UE can then process the P-CSI-RS over a wide bandwidth (or a relatively wide bandwidth).

In some examples, when the PDCCH and the P-CSI-RS are transmitted during the same wake-up signal occasion, either one or both can serve as the WUS. Additionally, in some examples, P-TRS may also be transmitted during the wake-up signal occasion to help with tracking loop updates. In some examples, both PDCCH and CSI-RS may be buffered. In some examples, if PDCCH-WUS is successfully decoded, then P-CSI-RS may be processed in the samples. Furthermore, CSI reporting may be done during the on-duration, which may further reduce turnaround time. In additional or alternative examples, the UE may monitor for presence of P-CSI-RS as the WUS. In some such examples, the UE and the base station may improve robustness of the P-CSI-RS. In some examples, the QCL between the PDCCH and the CSI-RS may be the same.

In some examples, the absence of a periodic reference signal, such as a P-TRS, can be used as a WUS for transitioning the UE to the on-duration. In some examples, the presence or absence of a periodic reference signal may be used to communicate information to the UE. In some examples, a pattern of transmission of the periodic reference signal may be used to indicate to the UE to wake up.

In some examples in which a reference signal is used as the WUS, detection of the signal (e.g., presence/absence of the signal) may convey information, such as 1-bit of information. For example, presence of the reference signal may be used as a WUS to indicate that the UE is to transition to the on-duration of the DRX cycle. In additional or alternative examples, an absence of the reference signal may be used as a WUS to transition the UE to receive data.

In some examples in which there are multiple bits to be conveyed, multiple reference signals may also be used in the WUS. For example, CSI-RS may be transmitted in different locations in time and/or frequency. For example, a first reference signal may be detected in a first location that indicates to the UE to transition to the on-duration, and a second reference signal may be detected in a second location that triggers a BWP configuration switch for the on-duration. In some such examples, if the second reference signal is not detected, then the UE may transition to the on-duration at the same BWP configuration as the wake-up signal occasion. In other such examples, the detection of a reference signal in the first location may indicate to the UE that the UE may transition to the on-duration at the same BWP configuration.

In some examples, the position and/or scrambling sequence of the reference signals may also be used to infer multi-bit information. For example, transmission in one out of four possible positions may carry two bits of information plus erasure state. For example, if a signal is not detected in any of the four positions, this may be an erasure state that indicates that the UE does not need to wake-up. Furthermore, the use of a particular scrambling sequence may carry information (e.g., regarding BWP configuration switching).

In some examples, the PDCCH-WUS may be transmitted in a single control resource set (CORESET). In some examples, the PDCCH-WUS may be transmitted in multiple CORESETS, for example, to improve robustness. In some such examples in which the PDCCH-WUS is transmitted in multiple CORESETs, the WUS decoded from the multiple CORESETs may be combined together depending on configuration information. For example, the UE may expect identical WUS information. In certain such examples, if inconsistent information is detected across the decoded WUS, the UE may either drop the WUS information or select WUS with better reliability.

In some examples, the BWP configuration associated with the wake-up signal occasion may be the same as the BWP configuration associated with the on-duration. In some examples, the BWP configuration associated with the wake-up signal occasion may be narrower (or lower power) than the BWP configuration associated with the on-duration. In some examples, the wake-up signal occasion may have a preconfigured BWP configuration that may be different than the BWP configuration associated with the on-duration. In some examples, the WUS received during the wake-up signal occasion may indicate the BWP configuration to use during the on-duration.

Figure 16:
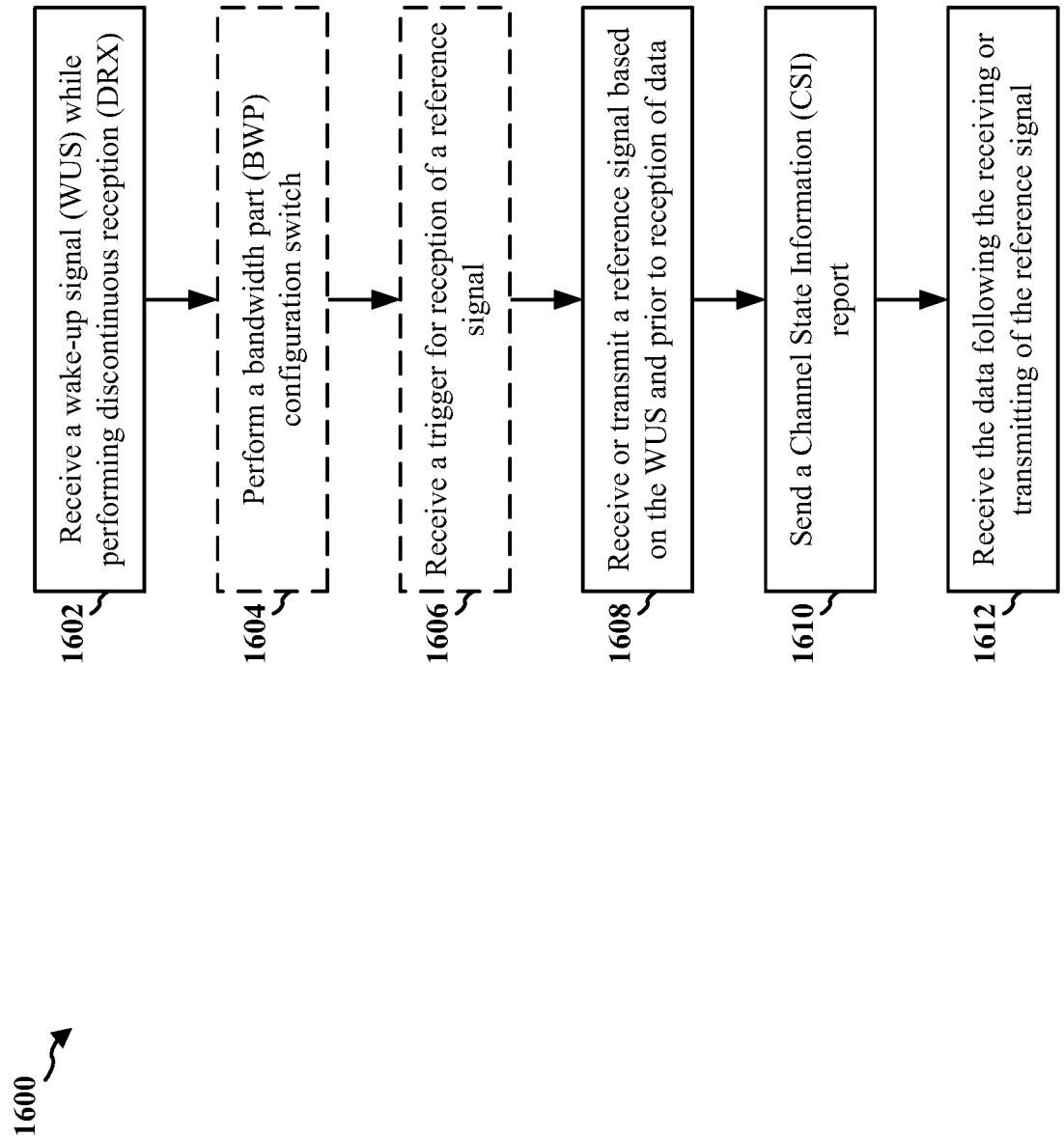
FIG. 16 is a flowchart of a method of wireless communication for a UE to employ wake-up signaling during an on-duration of a DRX cycle.

FIG. 16 is a flowchart 1600 of a method of wireless communication. The method may be performed by a UE or a component of a UE (e.g., the UE 104, 350, 402, 1002, 2250 and/or the apparatus 1802/1802'; the processing system 1914, which may include the memory and which may be the entire UE or a component of the UE). Optional aspects are illustrated with a dashed line. The method provides for improved power efficiency during DRX wake-up.

At 1602, the UE receives a wake-up signal (WUS) while performing discontinuous reception (DRX), as described in connection with the WUS 408 of FIG. 4. The reception may be performed, for example, by the WUS monitoring component 1806 of the apparatus 1802 of FIG. 18. The reception of the WUS may indicate data for transmission to the UE. In certain aspects, the WUS may comprise an uplink grant. In some examples, the WUS may comprise a downlink assignment without corresponding downlink data. In some examples, the WUS may be received in a single CORESET. In some examples, the WUS may be received in multiple CORESETs.

At 1604, the UE may perform a BWP configuration switch, as described in connection with 410 of FIG. 4. The BWP configuration switch may be performed, for example, by the BWP management component 1808 of the apparatus 1802 of FIG. 18. For example, the WUS may be received on a first BWP, and the UE may transition from the first BWP configuration to a second BWP configuration. In some examples, the reception of the WUS may trigger the BWP configuration switch. For example, the UE receiving the WUS comprising an uplink grant may trigger the BWP configuration switch. In other examples, the UE receiving the WUS comprising a downlink assignment without corresponding downlink data may trigger the BWP configuration switch. In some examples, a location of an expected reference signal in at least one of time, frequency, and/or a scrambling sequence of the expected reference signal conveys additional information to the UE. For example, the additional information may include instructions to perform a BWP configuration switch.

At 1606, the UE may receive a trigger for reception of a reference signal, as described in connection with the flow diagrams 500, 600 of FIGS. 5 and 6, respectively. The reception of the trigger may be performed, for example, by the trigger management component 1810 of the apparatus 1802 of FIG. 18. For example, the UE may receive a A-CSI-RS trigger for an A-CSI-RS. In some examples, the A-CSI-RS trigger may be received on the second BWP and may be spaced from the WUS by a slot offset sufficient to perform the BWP configuration switch.

At 1608, the UE receives or transmits a reference signal based on the WUS and prior to reception of the data, as described in connection with the reference signal 414 of FIG. 4, and/or the flow diagrams 800, 900 of FIGS. 8 and 9, respectively. The receipt or transmittal of the reference signal may be performed, for example, by the reference signal handling component 1812 of the apparatus 1802 of FIG. 18. In some examples, the reference signal may be received or transmitted on the second BWP (e.g., after the BWP configuration switch). In some examples, the UE may receive a reference signal that is an A-CSI-RS. In some such examples, the UE may receive the A-CSI-RS spaced from the WUS by a CSI offset. In some examples, the UE may receive the A-CSI-RS trigger within the same slot as the A-CSI-RS. In some examples, the UE may receive the A-CSI-RS spaced from the A-CSI-RS trigger by at least a CSI trigger offset.

In some examples, the reference signal may be an SRS that the UE transmits prior to receiving the data. In some examples, the SRS may be triggered by a downlink grant, an uplink grant, or group common downlink control information (DCI).

At 1610, the UE sends a CSI report, as described in connection with the CSI report 416 of FIG. 4. The sending of the CSI report may be performed, for example, by the CSI handling component 1814 of the apparatus 1802 of FIG. 18. For example, the UE may send the CSI report prior to receiving the data and in response to the reference signal, such as reception of the A-CSI-RS.

At 1612, the UE receives the data following the receiving or transmitting of the reference signal, as described in connection with the data 420 of FIG. 4. The receiving of the data may be performed, for example, by the data handling component 1816 of the apparatus 1802 of FIG. 18. For example, the UE receives the data indicated by the WUS. In some examples, the data is received based on channel quality information provided by the UE. For example, the channel quality information may be a CQI indicated by the CSI report. In other examples, the data may be received based on a channel quality associated with the SRS (e.g., a channel quality estimation based on the SRS).

Figure 17:
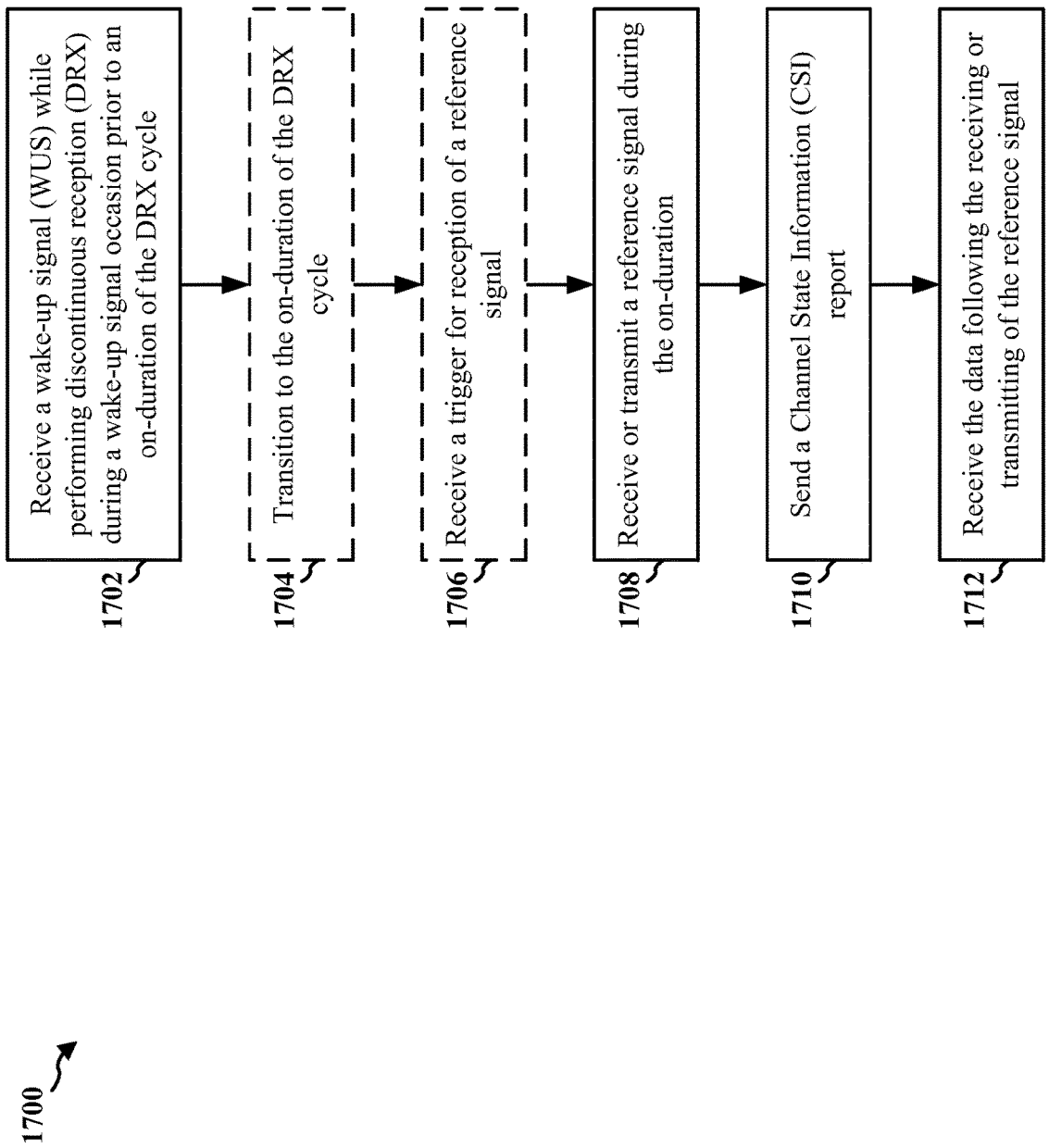
FIG. 17 is a flowchart of a method of wireless communication for a UE to employ wake-up signaling during a wake-up signal occasion of a DRX cycle.

FIG. 17 is a flowchart 1700 of a method of wireless communication. The method may be performed by a UE (e.g., the UE 104, 350, 402, 1002, 2250 and/or the apparatus 1802/1802'; the processing system 1914, which may include the memory and which may be the entire UE or a component of the UE). Optional aspects are illustrated with a dashed line. The method provides for improved power efficiency during DRX wake-up by utilizing a wake-up window prior to the on-duration of the DRX cycle.

At 1702, the UE receives a WUS while performing discontinuous reception (DRX) during a wake-up signal occasion prior to an on-duration of the DRX cycle, as described in connection with the WUS 1008 of FIG. 10. The reception of the WUS may be performed, for example, by the WUS monitoring component 1806 of the apparatus 1802 of FIG. 18. In some examples, the WUS may be comprised in at least one of control channel or another reference signal. In some examples, the UE may receive a P-TRS in addition to the WUS during the wake-up signal occasion. In some examples, the WUS received during the wake-up signal occasion may comprise a P-TRS. In some examples, the WUS may be received in a single CORESET. In some examples, the WUS may be received in multiple CORE-SETs. In some examples, presence or absence of an expected reference signal during the wake-up signal occasion, such as a P-TRS, may convey wake-up information to the UE.

In some examples, during the wake-up signal occasion, the UE may receive a periodic CSI-RS (P-CSI-RS) and a PDCCH. In some such examples, the WUS may be received in the P-CSI-RS and/or received in the PDCCH. In some examples in which the UE receives the P-CSI-RS and the PDCCH during the wake-up signal occasion, the BWP associated with the wake-up signal occasion may be a wide bandwidth to facilitate transmission of the data (i.e., the P-CSI-RS and the PDCCH). In some examples, in addition to the P-CSI-RS and the PDCCH, the UE may also receive P-TRS.

At 1704, after receiving the WUS, the UE may transition to the on-duration of the DRX cycle from the wake-up signal occasion, as described in connection with 1010 of FIG. 10. The transition to the on-duration may be performed, for example, by the BWP management component 1808 of the apparatus 1802 of FIG. 18. In some examples, the BWP associated with the wake-up signal occasion may be the same as the BWP associated with the on-duration. In some examples, the BWP associated with the wake-up signal occasion may be different than the BWP associated with the on-duration. For example, the BWP associated with the wake-up signal occasion may be a low power or narrower bandwidth than the BWP associated with the on-duration. In some such aspects, the BWP associated with the wake-up signal occasion may have a preconfigured relationship to the BWP associated with the on-duration. In some examples, the WUS received during the wake-up signal occasion may indicate the BWP for the on-duration.

At 1706, the UE may receive a trigger for reception of a reference signal, as described in connection with the flow diagrams 500, 600 of FIGS. 5 and 6, respectively. The reception of the trigger may be performed, for example, by the trigger management component 1810 of the apparatus 1802 of FIG. 18. For example, the UE may receive a A-CSI-RS trigger for an A-CSI-RS.

At 1708, the UE receives or transmits a reference signal during the on-duration and based on the receiving of the WUS, as described in connection with the reference signal 1014 of FIG. 10, and/or the flow diagrams 800, 900 of FIGS. 8 and 9, respectively. The receipt or transmittal of the reference signal may be performed, for example, by the reference signal handling component 1812 of the apparatus 1802 of FIG. 18. In some examples, during the on-duration of the DRX cycle, the UE may receive a trigger to receive the reference signal or to transmit the reference signal within a same slot as the trigger. In some examples, a location of an expected reference signal in at least one of time, frequency, or a scrambling sequence of the expected reference signal may convey additional information to the UE. For example, the additional information may include instructions to perform a BWP configuration switch.

In some examples, the UE may receive a reference signal that is an A-CSI-RS. In some examples, the UE may receive the A-CSI-RS trigger in the same slot as the A-CSI-RS.

In some examples, the reference signal may be an SRS that the UE transmits prior to receiving the data. In some examples, the SRS may be triggered by the UE transitioning to the on-duration. In some examples, the SRS may be triggered by a downlink grant, an uplink grant, or group common downlink control information (DCI).

At 1710, the UE sends a CSI report, as described in connection with the CSI report 1016 of FIG. 10. The sending of the CSI report may be performed, for example, by the CSI handling component 1814 of the apparatus 1802 of FIG. 18. For example, the UE may send the CSI report prior to receiving the data and based on the reference signal, such as reception of the A-CSI-RS.

At 1712, the UE receives the data following the receiving or transmitting of the reference signal, as described in connection with the data 1020 of FIG. 10. The receiving of the data may be performed, for example, by the data handling component 1816 of the apparatus 1802 of FIG. 18.

For example, the UE may receive the data indicated by the WUS. In some examples, the data may be received based on channel quality information provided by the UE. For example, the channel quality information may be a CQI indicated by the CSI report. In other examples, the data is received based on a channel quality associated with the SRS (e.g., a channel quality estimation based on the SRS).

Figure 18:
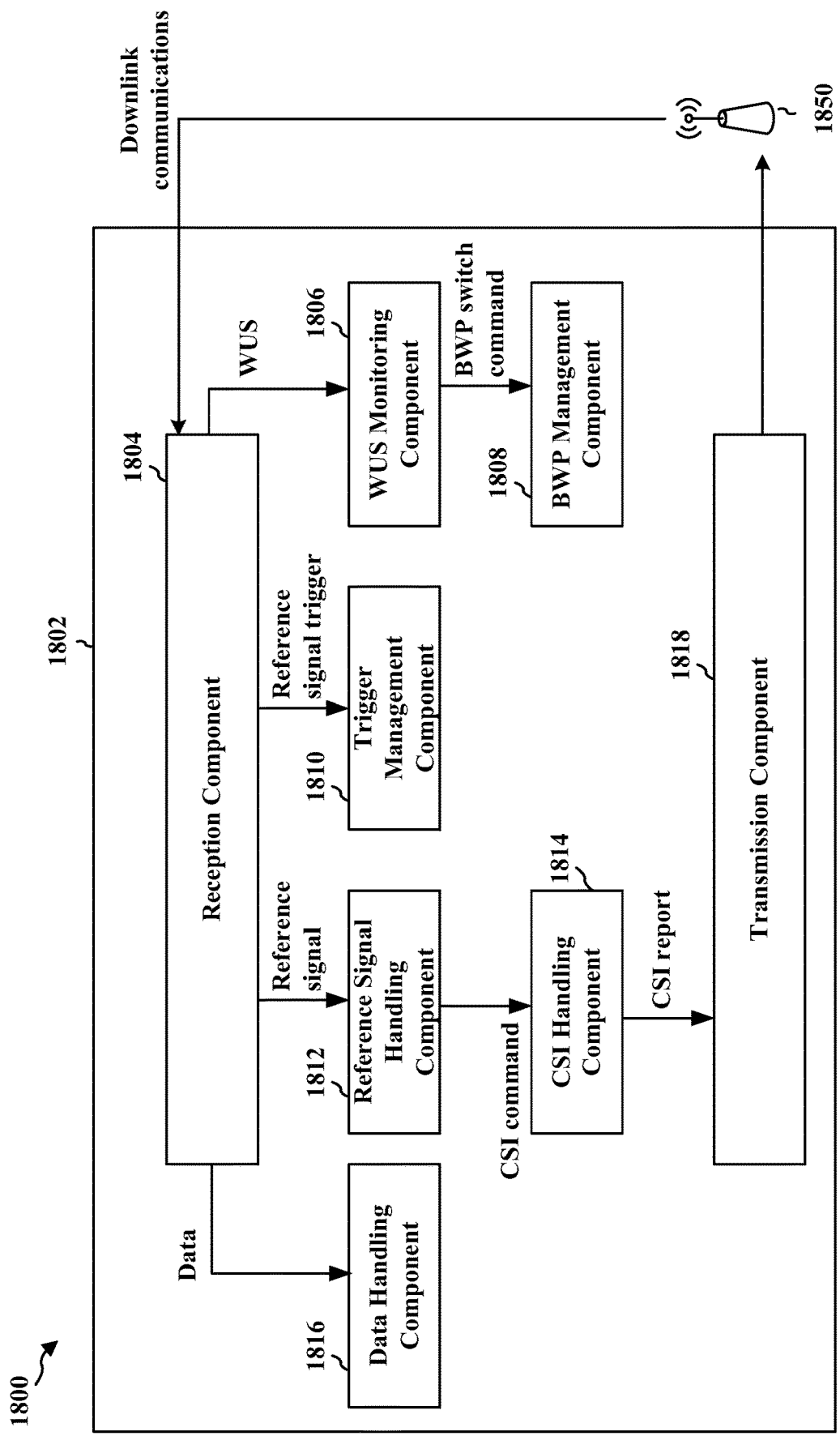
FIG. 18 is a conceptual data flow diagram illustrating the data flow between different means/components in an example apparatus.

FIG. 18 is a conceptual data flow diagram 1800 illustrating the data flow between different means/components in an example apparatus 1802. The apparatus may be a UE or a component of a UE, such as the UE 104. The apparatus 1802 includes a reception component 1804 that is configured to receive downlink communications from the base station 1850. The apparatus 1802 may include a WUS monitoring component 1806 that is configured to receive the WUS during an on-duration or during a wake-up signal occasion (e.g., as described in connection 1602/1702). The apparatus 1802 may include a BWP management component 1808 that is configured to perform a BWP switch and/or transition the UE from the wake-up signal occasion to the on-duration (e.g., as described in connection with 1604/1704). The apparatus 1802 may include a trigger management component 1810 that is configured to receive a trigger for reception of a reference signal (e.g., as described in connection with 1606/1706). The apparatus 1802 includes a reference signal handling component 1812 that is configured to receive or transmit a reference signal based on the WUS (e.g., as described in connection with 1608/1708). The apparatus 1802 may include a CSI handling component 1814 that is configured to generate a CSI report for transmitting (e.g., as described in connection with 1610/1710). The apparatus 1802 includes a data handling component 1816 that is configured to receive data following the receiving or transmitting of the reference signal (e.g., as described in connection with 1612/1712). The apparatus 1802 includes a transmission component 1818 that is configured to transmit uplink communications to the base station 1850.

The apparatus may include additional components that perform each of the blocks of the algorithm in the aforementioned flowcharts of FIGS. 16 and/or 17. As such, each block in the aforementioned flowcharts of FIGS. 16 and/or 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
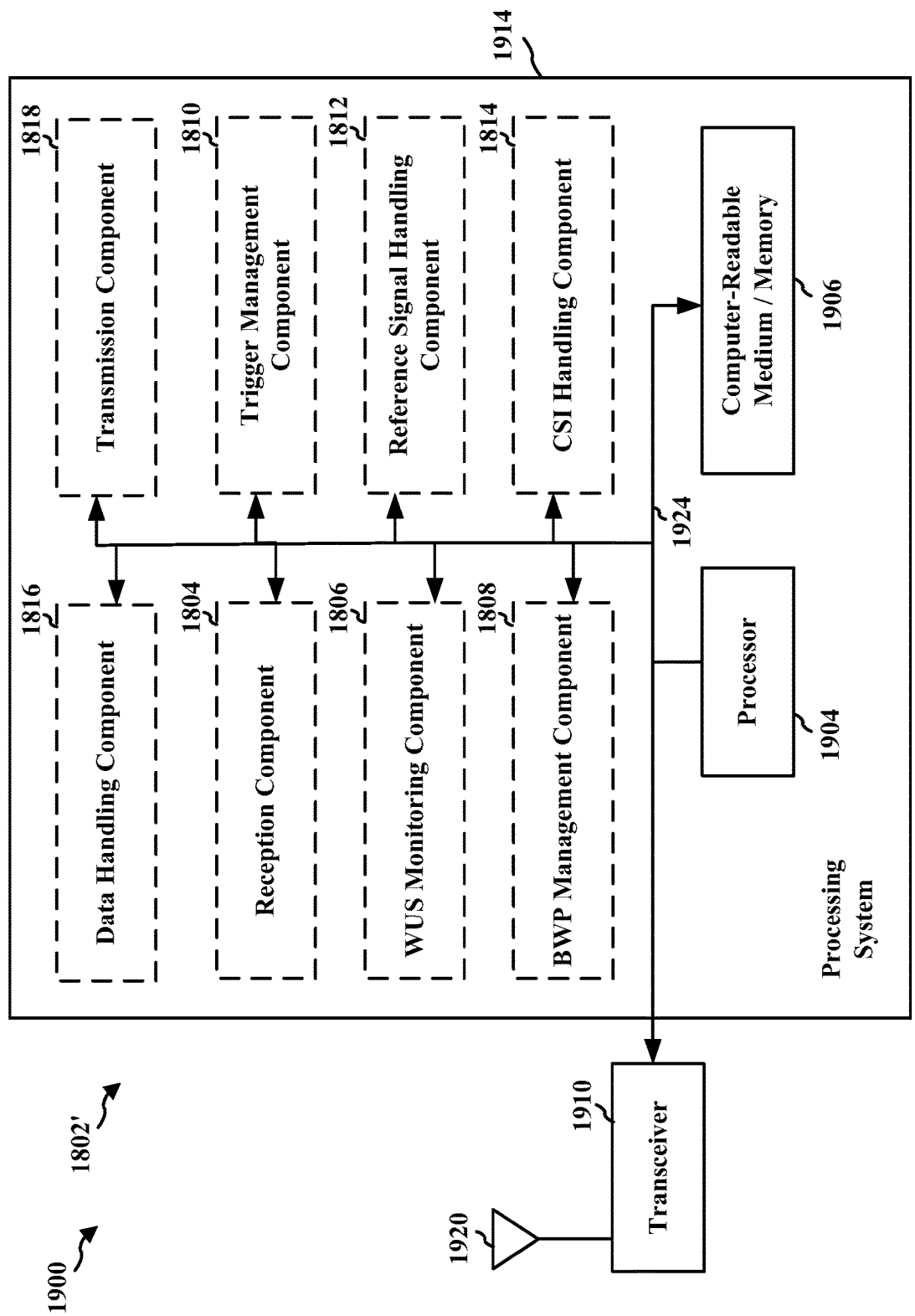
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814, 1816, and 1818 (as described in connection with FIG. 18), and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1818, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814, 1816, and 1818 (as described in connection with FIG. 18). The components may be software components running in the processor 1904, resident/stored in the computer readable medium/memory 1906, one or more hardware components coupled to the processor 1904, or some combination thereof. The processing system 1914 may be a component of the UE 350 and may include the memory 360 and/or at least one of the TX processor 368, the RX processor 356, and the controller/processor 359. Alternatively, the processing system 1914 may be the entire UE (e.g., see the UE 350 of FIG. 3).

In one configuration, the apparatus 1802/1802' for wireless communication includes means for receiving a wake-up signal (WUS) from a base station while performing a discontinuous reception (DRX) cycle, the WUS indicating data for transmission to the UE. The apparatus 1802/1802' may also include means for at least one of receiving a downlink reference signal or transmitting an uplink reference signal based on the WUS and prior to reception of the data, and in which the uplink reference signal is transmitted or the downlink reference signal is received during an on-duration of the DRX cycle and in response to receiving the WUS. The apparatus 1802/1802' may also include means for sending a CSI report to the base station based on the WUS and prior to the receiving of the data. The apparatus 1802/1802' may also include means for receiving the data following the receiving of the downlink reference signal or the transmitting of the uplink reference signal. In one configuration, the apparatus 1802/1802' may include means for receiving the WUS on a first bandwidth part (BWP) and the means for at least one of receiving the downlink reference signal or transmitting the uplink reference signal may be configured to receive the downlink reference signal or transmit the uplink reference signal on a second BWP, and where the WUS may comprise a downlink assignment without corresponding downlink data and the WUS may be configured to trigger a BWP configuration switch. The apparatus 1802/1802' may also include means for receiving a CSI-Reference Signal (CSI-RS) trigger for reception of the CSI-RS within a same slot as the CSI-RS trigger, where the CSI-RS trigger may be received on the second BWP and may be spaced from the WUS by a slot offset for BWP configuration transition. In one configuration, the apparatus 1802/1802' may include means for receiving the WUS on a first bandwidth part (BWP) and the means for at least one of receiving the downlink reference signal or transmitting the uplink reference signal may be configured to receive the downlink reference signal or transmit the uplink reference signal on a second BWP, where the WUS may comprise a downlink assignment without corresponding downlink data and the WUS may be configured to trigger a BWP configuration switch. The apparatus 1802/1802' may also include means for receiving a CSI-Reference Signal (CSI-RS) trigger for reception of the CSI-RS on the second BWP, where the CSI-RS trigger may be spaced from the WUS by a slot offset sufficient for BWP configuration transition, and where the reception of the CSI-RS may be spaced from the CSI-RS trigger by at least a CSI trigger offset. In one configuration, the apparatus 1802/1802' may include means for receiving the WUS during a wake-up signal occasion prior to the on-duration of the DRX cycle and to receive the WUS in a periodic-CSI-RS (P-CSI-RS) or in a Physical Downlink Control Channel (PDCCH), where the WUS may be comprised in at least one of a control channel or another reference signal, and where the means for at least one of receiving the downlink reference signal or transmitting the uplink reference signal may be configured to transmit the uplink reference signal or receive downlink reference signal during the on-duration and in response to receiving the WUS. The apparatus 1802/1802' may also include means for receiving a Periodic Tracking Reference Signal (P-TRS) during the wake-up signal occasion prior to the on-duration.

The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 20:
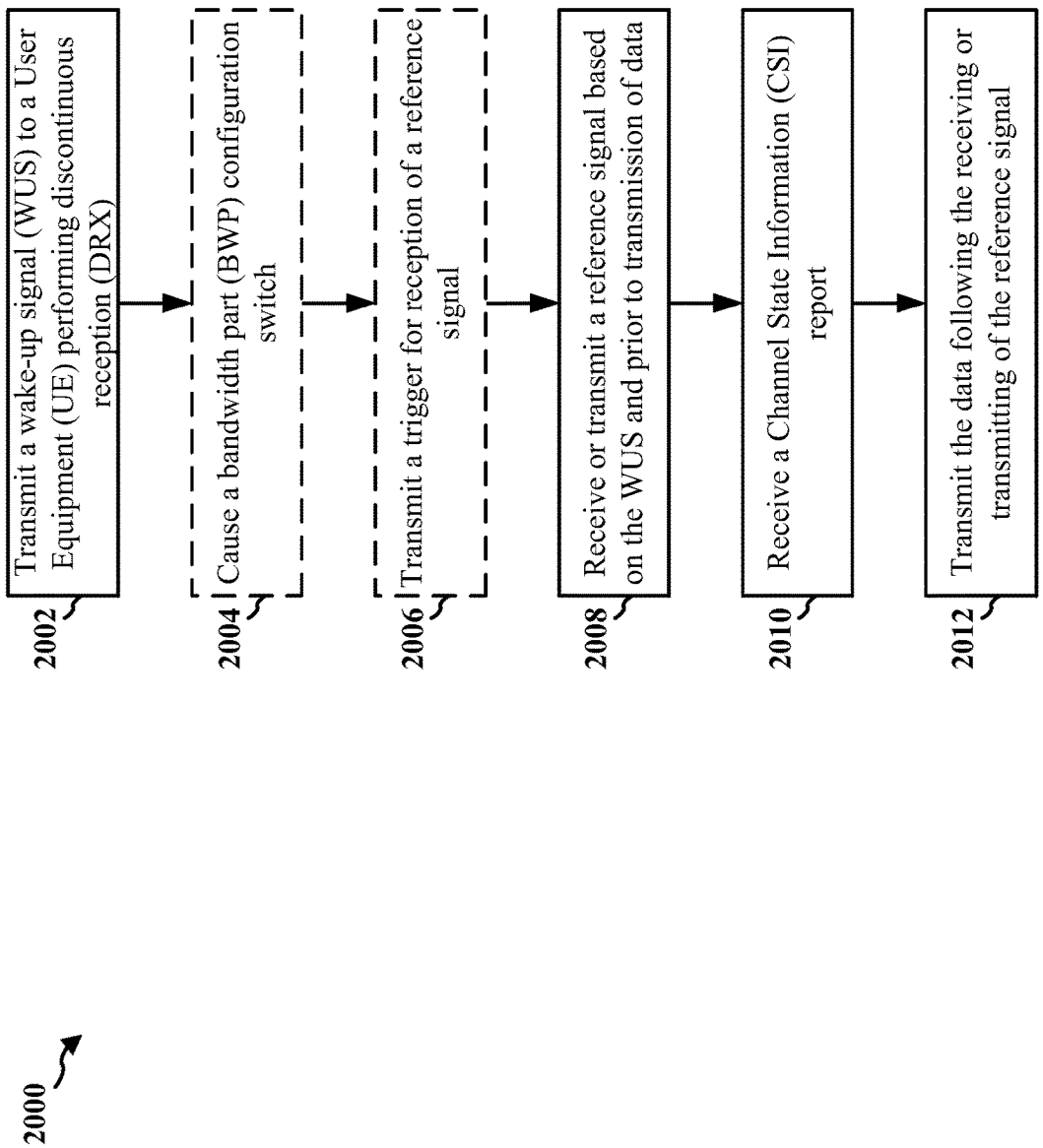
FIG. 20 is a flowchart of a method of wireless communication for a base station to employ wake-up signaling during an on-duration of a DRX cycle of a UE.

FIG. 20 is a flowchart 2000 of a method of wireless communication. The method may be performed by a base station or a component of a base station (e.g., the base station 102, 180, 310, 404, 1004, 1850, and/or the apparatus 2202/2202'; the processing system 2314, which may include the memory and which may be the entire base station or a component of the base station). Optional aspects are illustrated with a dashed line. The method provides for improved power efficiency during DRX wake-up.

At 2002, the base station transmits a wake-up signal (WUS) to a UE while the UE is performing discontinuous reception (DRX), as described in connection with the WUS 408 of FIG. 4. The transmission may be performed, for example, by the WUS management component 2206 of the apparatus 2202 of FIG. 22. The transmission of the WUS may indicate data for transmission to the UE. In some examples, the WUS may comprise an uplink grant. In some examples, the WUS may comprise a downlink assignment without corresponding downlink data. In some examples, the WUS may be transmitted in a single CORESET. In certain aspects, the WUS may be transmitted in multiple CORESETs.

At 2004, the base station may cause a BWP configuration switch, as described in connection with 410 of FIG. 4. For example, the WUS may be transmitted on a first BWP, and the base station may cause the UE to transition from the first BWP to a second BWP. The causing of the BWP configuration switch may be performed, for example, by the BWP management component 2208 of the apparatus 2202 of FIG. 22. In some examples, the transmitting of the WUS may trigger the UE to perform the BWP configuration switch. For example, the base station transmitting the WUS comprising an uplink grant may trigger the BWP configuration switch by the UE. In other examples, the transmission of the WUS comprising a downlink assignment without corresponding downlink data may trigger the BWP configuration switch. In some examples, a location of an expected reference signal in at least one of time, frequency, or a scrambling sequence of the expected reference signal may convey additional information to the UE. For example, the additional information may include instructions for the UE to perform a BWP configuration switch.

At 2006, the base station may transmit a trigger for reception (at the UE) of a reference signal, as described in connection with the flow diagrams 500, 600 of FIGS. 5 and 6, respectively. The transmitting of the trigger may be performed, for example, by the trigger management component 2210 of the apparatus 2202 of FIG. 22. For example, the base station may transmit a A-CSI-RS trigger for an A-CSI-RS. In some examples, the base station may transmit the A-CSI-RS trigger on the second BWP and the A-CSI-RS trigger may be spaced from the transmitting of the WUS by a slot offset sufficient for the UE to perform the BWP configuration switch.

At 2008, the base station receives or transmits a reference signal based on the WUS and prior to transmitting of the data, as described in connection with the reference signal 414 of FIG. 4, and/or the flow diagrams 800, 900 of FIGS. 8 and 9, respectively. The receiving or transmitting of the reference signal may be performed, for example, by the reference signal handling component 2212 of the apparatus 2202 of FIG. 22. In some examples, the reference signal may be received or transmitted on the second BWP (e.g., after the BWP configuration switch). In some examples, the base station may transmit a reference signal that is an A-CSI-RS. In some such examples, the base station may transmit the A-CSI-RS spaced from the WUS by a CSI trigger offset. In some examples, the base station may transmit the A-CSI-RS trigger within the same slot as the A-CSI-RS. In some examples, the base station may transmit the A-CSI-RS spaced from the A-CSI-RS trigger by at least a CSI trigger offset.

In some examples, the reference signal may be an SRS that the base station receives from the UE prior to transmitting the data. In some examples, the SRS is triggered by a downlink grant, an uplink grant, or group common downlink control information (DCI).

At 2010, the base station receives a CSI report, as described in connection with the CSI report 416 of FIG. 4. The receiving of the CSI report may be performed, for example, by the CSI handling component 2214 of the apparatus 2202 of FIG. 22. For example, the base station may receive the CSI report prior to transmitting the data to the UE and based on the reference signal, such as the transmitting of the A-CSI-RS.

At 2012, the base station transmits the data following the receiving or transmitting of the reference signal, as described in connection with the data 420 of FIG. 4. The transmitting of the data may be performed, for example, by the data handling component 2216 of the apparatus 2202 of FIG. 22. For example, the base station may transmit the data indicated by the WUS. In some examples, the base station may transmit the data based on channel quality information provided by the UE. For example, the channel quality information may be a CQI indicated by the CSI report. In other examples, the base station may transmit the data based on a channel quality associated with the SRS (e.g., a channel quality estimation based on the SRS) received from the UE.

Figure 21:
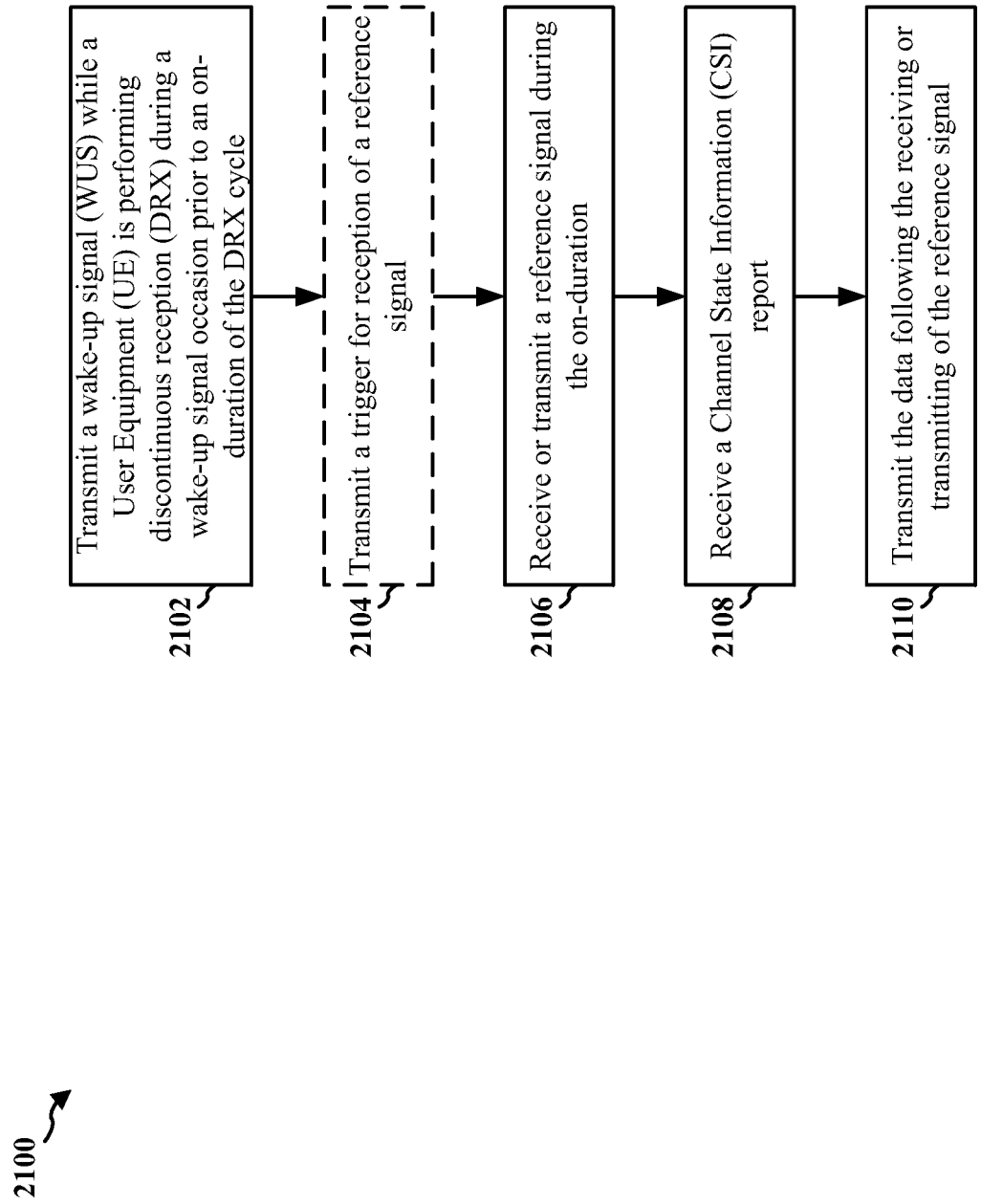
FIG. 21 is a flowchart of a method of wireless communication for a base station to employ wake-up signaling during a wake-up signal occasion of a DRX cycle of a UE.

FIG. 21 is a flowchart 2100 of a method of wireless communication. The method may be performed by a base station or a component of a base station (e.g., the base station 102, 180, 310, 404, 1004, 1850, and/or the apparatus 2202/2202'; the processing system 2314, which may include the memory and which may be the entire base station or a component of the base station). Optional aspects are illustrated with a dashed line. The method provides for improved power efficiency during DRX wake-up by utilizing a wake-up window prior to the on-duration of the DRX cycle.

At 2102, the base station transmits a WUS to a UE while the UE is performing discontinuous reception (DRX) during a wake-up signal occasion prior to an on-duration of the DRX cycle, as described in connection with the WUS 1008 of FIG. 10. The transmission of the WUS may be performed, for example, by the WUS management component 2206 of the apparatus 2202 of FIG. 22. In some examples, the WUS may be comprised in at least one of control channel or another reference signal. In some examples, the base station may transmit a P-TRS in addition to the WUS during the wake-up signal occasion. In some examples, the WUS transmitted during the wake-up signal occasion may comprise a P-TRS. In some examples, the base station may transmit the WUS in a single CORESET. In some examples, the base station may transmit the WUS in multiple CORESETs. In some examples, presence or absence of an expected reference signal during the wake-up signal occasion, such as a P-TRS, may convey wake-up information to the UE.

In some examples, during the wake-up signal occasion, the base station may transmit a periodic CSI-RS (P-CSI-RS) and a PDCCH. In some such examples, the base station may transmit the WUS in the P-CSI-RS and/or in the PDCCH. In some examples in which the base station transmits the P-CSI-RS and the PDCCH during the wake-up signal occasion, the BWP associated with the wake-up signal occasion may be a wide bandwidth to facilitate transmission of the data (i.e., the P-CSI-RS and the PDCCH). In some examples, in addition to the P-CSI-RS and the PDCCH, the base station may also transmit a P-TRS.

At 2104, the base station may transmit a trigger for reception (at the UE) of a reference signal, as described in connection with the flow diagrams 500, 600 of FIGS. 5 and 6, respectively. The transmitting of the trigger may be performed, for example, by the trigger management component 2210 of the apparatus 2202 of FIG. 22. For example, the base station may transmit an A-CSI-RS trigger for an A-CSI-RS.

At 2106, the base station receives or transmits a reference signal during the on-duration of the DRX cycle of the UE and in response to transmitting the WUS, as described in connection with the reference signal 1014 of FIG. 10. The receiving or transmitting of the reference signal may be performed, for example, by the reference signal handling component 2212 of the apparatus 2202 of FIG. 22. In some examples, during the on-duration, the base station may transmit a trigger for reception (at the UE) of the reference signal within a same slot as the trigger. In some examples, a location of an expected reference signal in at least one of time, frequency, or a scrambling sequence of the expected reference signal may convey additional information to the UE. For example, the additional information may include instructions for the UE to perform a BWP configuration switch.

In some examples, the base station may transmit a reference signal that is an A-CSI-RS. In some examples, the base station may transmit the A-CSI-RS trigger in the same slot as the A-CSI-RS.

In some examples, the reference signal may be an SRS that the base station receives (from the UE) prior to the base station transmitting the data. In some examples, the transmitting of the SRS by the UE (and subsequent receiving of the SRS by the base station) may be triggered by the UE transitioning to an on-duration of the DRX cycle. In some examples, the transmitting of the SRS by the UE (and subsequent receiving of the SRS by the base station) may be triggered by a downlink grant, an uplink grant, or group common downlink control information (DCI).

At 2108, the base station receives a CSI report, as described in connection with the CSI report 1016 of FIG. 10. The receiving of the CSI report may be performed, for example, by the CSI handling component 2214 of the apparatus 2202 of FIG. 22. For example, the base station may receive the CSI report prior to the base station transmitting the data and based on the reference signal, such as transmission of the A-CSI-RS.

At 2110, the base station may transmit the data following the receiving or transmitting of the reference signal, as described in connection with the data 1020 of FIG. 10. The transmitting of the data may be performed, for example, by the data handling component 2216 of the apparatus 2202 of FIG. 22. For example, the base station may transmit the data indicated by the WUS. In some examples, the base station may transmit the data based on channel quality information provided by the UE. For example, the channel quality information may be a CQI indicated by the CSI report. In other examples, the base station may transmit the data based on a channel quality associated with the SRS (e.g., a channel quality estimation based on the SRS).

Figure 22:
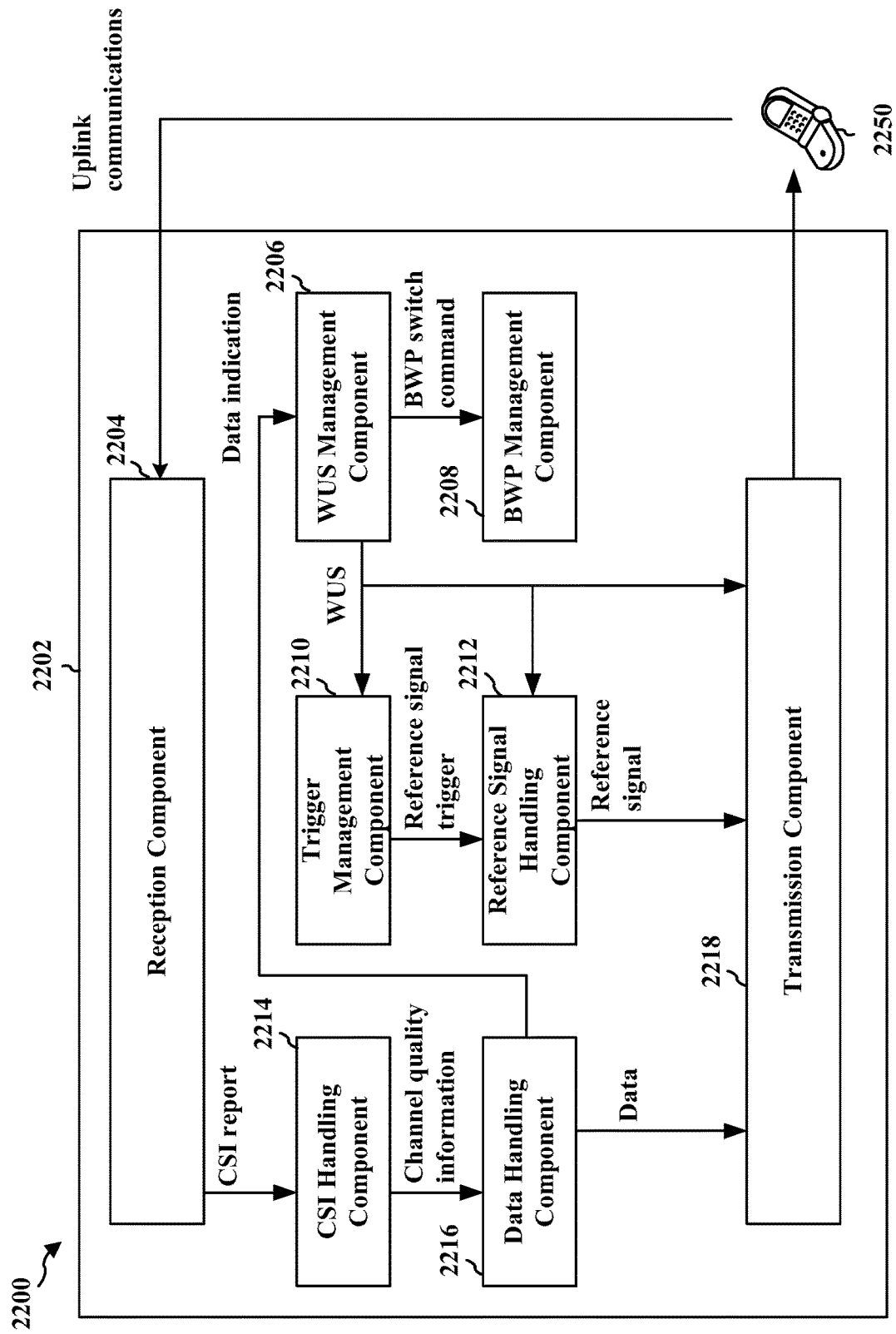
FIG. 22 is a conceptual data flow diagram illustrating the data flow between different means/components in an example apparatus.

FIG. 22 is a conceptual data flow diagram 2200 illustrating the data flow between different means/components in an example apparatus 2202. The apparatus may be a base station or a component of a base station, such as the base station 102. The apparatus 2202 includes a reception component 2204 that is configured to receive uplink communications from the UE 2250. The apparatus 2202 includes a WUS management component 2206 that is configured to transmit a WUS to a UE performing DRX during an on-duration or during a wake-up signal occasion (e.g., as described in connection with 2002/2102). The apparatus 2202 may include a BWP management component 2208 that is configured to facilitate performing a BWP switch and/or facilitate the UE transitioning from the wake-up signal occasion to the on-duration (e.g., as described in connection with 2004). The apparatus 2202 may include a trigger management component 2210 that is configured to transmit a trigger for reception of a reference signal (e.g., as described in connection with 2006/2104). The apparatus 2202 includes a reference signal handling component 2212 that is configured to receive or transmit a reference signal based on the WUS (e.g., as described in connection with 2008/2106). The apparatus 2202 may include a CSI management component 2214 that is configured to receive a CSI report and/or channel quality information (e.g., as described in connection with 2010/2108). The apparatus 2202 includes a data management component 2216 that is configured to transmit data following the receiving or transmitting of the reference signal (e.g., as described in connection with 2012/2110). The apparatus 2202 includes a transmission component 2218 that is configured to transmit downlink communications to the UE 2250.

The apparatus may include additional components that perform each of the blocks of the algorithm in the aforementioned flowcharts of FIGS. 20 and/or 21. As such, each block in the aforementioned flowcharts of FIGS. 20 and/or 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 23:
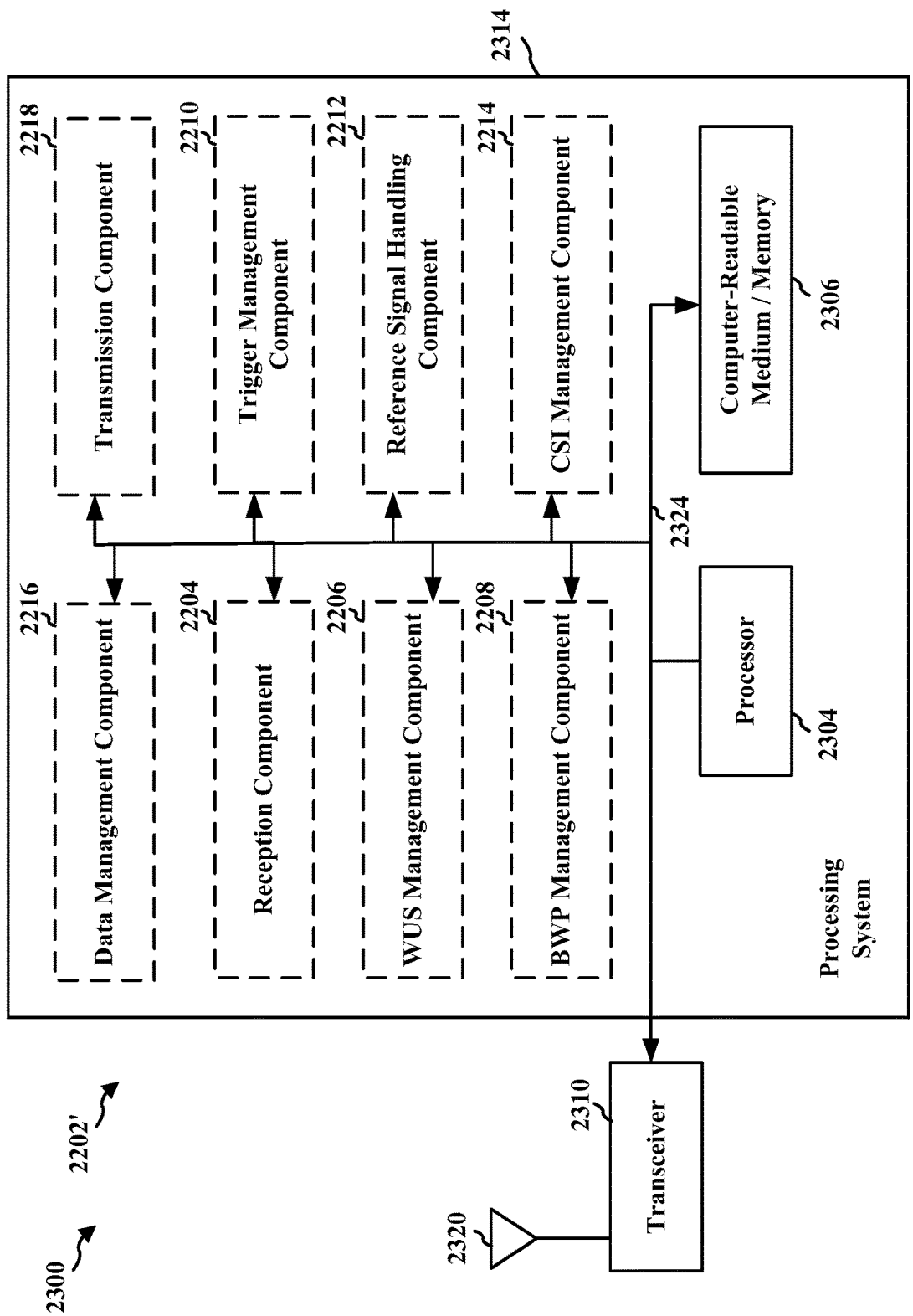
FIG. 23 is a diagram illustrating an example of a hardware implementation for an apparatus employing a processing system.

FIG. 23 is a diagram 2300 illustrating an example of a hardware implementation for an apparatus 2202' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware components, represented by the processor 2304, the components 2204, 2206, 2208, 2210, 2212, 2214, 2216, 2218 (as described in connection with FIG. 22), and the computer-readable medium/memory 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the reception component 2204. In addition, the transceiver 2310 receives information from the processing system 2314, specifically the transmission component 2218, and based on the received information, generates a signal to be applied to the one or more antennas 2320. The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described supra for any particular apparatus. The computer-readable medium/memory 2306 may also be used for storing data that is manipulated by the processor 2304 when executing software. The processing system 2314 further includes at least one of the components 2204, 2206, 2208, 2210, 2212, 2214, 2216, 2218 (as described in connection with FIG. 22). The components may be software components running in the processor 2304, resident/stored in the computer readable medium/memory 2306, one or more hardware components coupled to the processor 2304, or some combination thereof. The processing system 2314 may be a component of the base station 310 and may include the memory 376 and/or at least one of the TX processor 316, the RX processor 370, and the controller/processor 375. Alternatively, the processing system 2314 may be the entire base station (e.g., see the base station 310 of FIG. 3).

In one configuration, the apparatus 2202/2202' for wireless communication includes means for means for transmitting a wake-up signal (WUS) to a User Equipment (UE) performing a discontinuous reception (DRX) cycle, the WUS configured to indicate data for transmission to the UE. The example apparatus 2202/2202' may also include means for at least one of receiving an uplink reference signal or transmitting a downlink reference signal based on the WUS and prior to transmission of the data, wherein the downlink reference signal or the uplink reference signal is respectively transmitted or received during an on-duration of the DRX cycle and after receipt of the WUS at the UE. Further, the apparatus 2202/2202' may include means for receiving a Channel State Information (CSI) report from the UE based on the WUS and prior to the transmission of the data. Additionally, the apparatus 2202/2202' may include means for transmitting the data to the UE following the respective receiving or transmitting of the uplink reference signal or the downlink reference signal. In one configuration, the apparatus 2202/2202' may include means for transmitting the WUS on a first bandwidth part (BWP) and the means for at least one of receiving the uplink reference signal or transmitting the downlink reference signal may be configured to respectively receive the uplink reference signal or transmit the downlink reference signal on a second BWP, where the WUS may comprise a downlink assignment without corresponding downlink data and the WUS may be configured to trigger a BWP configuration switch. The apparatus 2202/2202' may also include means for transmitting a CSI-RS trigger for transmission of the CSI-RS within a same slot as the CSI-RS trigger, where the CSI-RS trigger may be transmitted on the second BWP and may be spaced from the WUS by a slot offset for BWP configuration transition. In one configuration, the apparatus 2202/2202' may include means for transmitting the WUS on a first bandwidth part (BWP) and the means for at least one of receiving the uplink reference signal or transmitting the downlink reference signal may be configured to receive the uplink reference signal or transmit the downlink reference signal on a second BWP, where the WUS may comprise a downlink assignment without corresponding downlink data and the WUS may be configured to trigger a BWP configuration switch. The apparatus 2202/2202' may also include means for transmitting a CSI-RS trigger for transmission of the CSI-RS on the second BWP, where the CSI-RS trigger may be spaced from the WUS by a slot offset sufficient for BWP configuration transition, and where the transmission of the CSI-RS may be spaced from the CSI-RS trigger by at least a CSI trigger offset. In one configuration, the apparatus 2202/2202' may include means for transmitting the WUS during a wake-up signal occasion prior to the on-duration of the DRX cycle and to transmit the WUS in a periodic-CSI-RS (P-CSI-RS) or in a Physical Downlink Control Channel (PDCCH), where the WUS may be comprised in at least one of a control channel or another reference signal, and where the means for at least one of receiving the uplink reference signal or transmitting the downlink reference signal may be configured to receive the uplink reference signal or transmit the downlink reference signal during the on-duration and after receipt of the WUS at the UE. The apparatus 2202/2202' may also include means for transmitting a Periodic Tracking Reference Signal (P-TRS) during the wake-up signal occasion prior to the on-duration.

The aforementioned means may be one or more of the aforementioned components of the apparatus 2202 and/or the processing system 2314 of the apparatus 2202' configured to perform the functions recited by the aforementioned means. As described supra, the processing system 2314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Example 1 is a method of wireless communication at a User Equipment (UE), comprising: receiving a wake-up signal (WUS) from a base station while performing a discontinuous reception (DRX) cycle, the WUS indicating data for transmission to the UE; at least one of receiving a downlink reference signal or transmitting an uplink reference signal based on the WUS and prior to reception of the data, wherein the uplink reference signal or the downlink reference signal is respectively transmitted or received during an on-duration of the DRX cycle and in response to receiving the WUS; sending a Channel State Information (CSI) report to the base station based on the WUS and prior to the receiving of the data; and receiving the data following the respective receiving or transmitting of the downlink reference signal or uplink reference signal.

In Example 2, the method of Example 1 further includes that the WUS is received in multiple control resource sets (CORESETs).

In Example 3, the method of Example 1 further includes that the WUS is received in a single control resource set (CORESET).

In Example 4, the method of any of Examples 1 to 3 further includes that the downlink reference signal comprises a CSI-Reference Signal (CSI-RS), and wherein the receiving of the data is based on the CSI report.

In Example 5, the method of any of Examples 1 to 4 further includes that the WUS is received on a first bandwidth part (BWP) and the downlink reference signal is received on a second BWP, and wherein the WUS comprises an uplink grant triggering a BWP configuration switch and reception of the CSI-RS is spaced from the WUS by a CSI offset.

In Example 6, the method of any of Examples 1 to 5 further includes that wherein the WUS is received on a first bandwidth part (BWP) and the downlink reference signal or the uplink reference signal is respectively received or transmitted on a second BWP, the WUS comprises a downlink assignment without corresponding downlink data, and the WUS triggers a BWP configuration switch.

In Example 7, the method of any of Examples 1 to 6 further includes receiving a CSI-Reference Signal (CSI-RS) trigger for reception of the CSI-RS within a same slot as the CSI-RS trigger, wherein the CSI-RS trigger is received on the second BWP and is spaced from the WUS by a slot offset for BWP configuration transition.

In Example 8, the method of any of Examples 1 to 7 further includes receiving a CSI-Reference Signal (CSI-RS) trigger for reception of the CSI-RS on the second BWP, wherein the CSI-RS trigger is spaced from the WUS by a slot offset sufficient for BWP configuration transition, and wherein the reception of the CSI-RS is spaced from the CSI-RS trigger by at least a CSI trigger offset.

In Example 9, the method of any of Examples 1 to 8 further includes that the WUS is received on a first bandwidth part (BWP) and the downlink reference signal or the uplink reference signal is respectively received or transmitted on a second BWP.

In Example 10, the method of any of Examples 1 to 9 further includes the uplink reference signal comprises a sounding reference signal (SRS), wherein the UE transmits the SRS to the base station based on the WUS and prior to the receiving of the data, and wherein the receiving of the data is based on a channel quality associated with the SRS.

In Example 11, the method of any of Examples 1 to 10 further includes that the WUS is received during a wake-up signal occasion prior to the on-duration of the DRX cycle, wherein the WUS is comprised in at least one of a control channel or another reference signal.

In Example 12, the method of any of Examples 1 to 11 further includes that during the on-duration, the UE receives a trigger to receive the downlink reference signal or to transmit the uplink reference signal within the same slot as the trigger.

In Example 13, the method of any of Examples 1 to 12 further includes that the UE further receives a Periodic Tracking Reference Signal (P-TRS) during the wake-up signal occasion prior to the on-duration, and wherein the WUS received during the wake-up signal occasion is comprised in the control channel.

In Example 14, the method of any of Examples 1 to 13 further includes that the WUS received during the wake-up signal occasion prior to the on-duration comprises a Periodic Tracking Reference Signal (P-TRS).

In Example 15, the method of any of Examples 1 to 14 further includes that the WUS that is received during the wake-up signal occasion prior to the on-duration is received on a same bandwidth part (BWP) as the uplink reference signal or the downlink reference signal that is respectively transmitted or received during the on-duration.

In Example 16, the method of any of Examples 1 to 15 further includes that the WUS is received on a first bandwidth part (BWP) during the wake-up signal occasion prior to the on-duration, and the uplink reference signal or the downlink reference signal is respectively transmitted or received on a second BWP during the on-duration.

In Example 17, the method of any of Examples 1 to 16 further includes that the first BWP has a preconfigured relationship to the second BWP.

In Example 18, the method of any of Examples 1 to 17 further includes that the WUS indicates the second BWP for the on-duration.

In Example 19, the method of any of Examples 1 to 18 further includes the UE receives a Periodic Channel State Information Reference Signal (P-CSI-RS) during the wake-up signal occasion prior to the on-duration.

In Example 20, the method of any of Examples 1 to 19 further includes that the P-CSI-RS is received over a wide bandwidth.

In Example 21, the method of any of Examples 1 to 20 further includes that the WUS is received in the P-CSI-RS or received in a Physical Downlink Control Channel (PDCCH).

In Example 22, the method of any of Examples 1 to 21 further includes receiving a Periodic Tracking Reference Signal (P-TRS) during the wake-up signal occasion prior to the on-duration.

In Example 23, the method of any of Examples 1 to 22 further includes that presence or absence of an expected downlink reference signal conveys wake-up information to the UE.

In Example 24, the method of any of Examples 1 to 23 further includes that a location of an expected downlink reference signal in at least one of time or frequency or a scrambling sequence of the expected downlink reference signal conveys additional information to the UE.

In Example 25, the method of any of Examples 1 to 24 further includes that the additional information comprises instructions to perform a bandwidth part (BWP) configuration switch.

Example 26 is a device including one or more processors and one or more memories in electronic communication with the one or more processors storing instructions executable by the one or more processors to cause a system or an apparatus to implement a method as in any of Examples 1 to 25.

Example 27 is a system or apparatus including means for implementing a method or realizing an apparatus as in any of Examples 1 to 25.

Example 28 is a non-transitory computer-readable medium storing instructions executable by one or more processors to cause the one or more processors to implement a method as in any of Examples 1 to 25.

Example 29 is a method of wireless communication at a base station, comprising: transmitting a wake-up signal (WUS) to a User Equipment (UE) performing a discontinuous reception (DRX) cycle, the WUS indicating data for transmission to the UE; at least one of receiving an uplink reference signal or transmitting a downlink reference signal based on the WUS and prior to transmission of the data, wherein the downlink reference signal or uplink reference signal is respectively transmitted or received during an on-duration of the DRX cycle and after receipt of the WUS at the UE; receiving a Channel State Information (CSI) report from the UE based on the WUS and prior to the transmission of the data; and transmitting the data following the respective receiving or transmitting of the uplink reference signal or downlink reference signal.

In Example 30, the method of Example 29 further includes that the WUS is transmitted in multiple control resource sets (CORESETs).

In Example 31, the method of Example 29 further includes that wherein the WUS is transmitted in a single control resource set (CORESET).

In Example 32, the method of any of Examples 29 to 31 further includes the downlink reference signal comprises a CSI-Reference Signal (CSI-RS), and wherein the transmitting of the data is based on the CSI report.

In Example 33, the method of any of Examples 29 to 32 further includes that the WUS is transmitted on a first bandwidth part (BWP) and the downlink reference signal is transmitted on a second BWP, and wherein the WUS comprises an uplink grant triggering a BWP configuration switch and transmission of the CSI-RS is spaced from the WUS by a CSI offset.

In Example 34, the method of any of Examples 29 to 33 further includes the WUS is transmitted on a first bandwidth part (BWP) and the uplink reference signal or the downlink reference signal is respectively received or transmitted on a second BWP, the WUS comprises a downlink assignment without corresponding downlink data, and the WUS triggers a BWP configuration switch.

In Example 35, the method of any of Examples 29 to 34 further includes transmitting a CSI-RS trigger for reception of the CSI-RS at the UE within a same slot as the CSI-RS trigger, wherein the CSI-RS trigger is transmitted on the second BWP and is spaced from the WUS by a slot offset for BWP configuration transition.

In Example 36, the method of any of Examples 29 to 35 further includes transmitting a CSI-RS trigger for transmission of the CSI-RS on the second BWP, wherein the CSI-RS trigger is spaced from the WUS by a slot offset sufficient for BWP configuration transition, and wherein the transmission of the CSI-RS is spaced from the CSI-RS trigger by at least a CSI trigger offset.

In Example 37, the method of any of Examples 29 to 36 further includes that the WUS is transmitted on a first bandwidth part (BWP) and the uplink reference signal or the downlink reference signal is respectively received or transmitted on a second BWP.

In Example 38, the method of any of Examples 29 to 37 further includes that the uplink reference signal comprises a sounding reference signal (SRS), wherein the base station receives the SRS from the UE based on the WUS and prior to the transmitting of the data, and wherein the transmitting of the data is based on a channel quality associated with the SRS.

In Example 39, the method of any of Examples 29 to 38 further includes that the WUS is transmitted during a wake-up signal occasion prior to the on-duration of the DRX cycle, wherein the WUS is comprised in at least one of a control channel or another reference signal.

In Example 40, the method of any of Examples 29 to 39 further includes that during the on-duration, the base station transmits a trigger to transmit the downlink reference signal or to receive the uplink reference signal within the same slot as the trigger.

In Example 41, the method of any of Examples 29 to 40 further includes that the base station further transmits a Periodic Tracking Reference Signal (P-TRS) during the wake-up signal occasion prior to the on-duration, and wherein the WUS received during the wake-up signal occasion is comprised in the control channel.

In Example 42, the method of any of Examples 29 to 41 further includes that the WUS transmitted during the wake-up signal occasion prior to the on-duration comprises a Periodic Tracking Reference Signal (P-TRS).

In Example 43, the method of any of Examples 29 to 42 further includes that the WUS that is transmitted during the wake-up signal occasion prior to the on-duration is transmitted on a same bandwidth part (BWP) as the downlink reference signal or the uplink reference signal that is respectively transmitted or received during the on-duration.

In Example 44, the method of any of Examples 29 to 43 further includes that the WUS is transmitted on a first bandwidth part (BWP) during the wake-up signal occasion prior to the on-duration, and the downlink reference signal or the uplink reference signal is respectively transmitted or received on a second BWP during the on-duration.

In Example 45, the method of any of Examples 29 to 44 further includes that the WUS indicates the second BWP for the on-duration.

In Example 46, the method of any of Examples 29 to 45 further includes that the base station transmits a Periodic Channel State Information Reference Signal (P-CSI-RS) during the wake-up signal occasion prior to the on-duration.

In Example 47, the method of any of Examples 29 to 46 further includes that the P-CSI-RS is transmitted over a wide bandwidth.

In Example 48, the method of any of Examples 29 to 47 further includes that the WUS is transmitted in the P-CSI-RS or transmitted in a Physical Downlink Control Channel (PDCCH).

In Example 49, the method of any of Examples 29 to 48 further includes transmitting a Periodic Tracking Reference Signal (P-TRS) during the wake-up signal occasion prior to the on-duration.

In Example 50, the method of any of Examples 29 to 49 further includes that wherein presence or absence of an expected downlink reference signal conveys wake-up information to the UE.

Example 51 is a device including one or more processors and one or more memories in electronic communication with the one or more processors storing instructions executable by the one or more processors to cause a system or an apparatus to implement a method as in any of Examples 29 to 50.

Example 52 is a system or apparatus including means for implementing a method or realizing an apparatus as in any of Examples 29 to 50.

Example 53 is a non-transitory computer-readable medium storing instructions executable by one or more processors to cause the one or more processors to implement a method as in any of Examples 29 to 50.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a User Equipment (UE), comprising:
   monitoring for a wake-up signal (WUS) from a base station on resources associated with multiple control resource sets (CORESETs), including monitoring for the WUS while performing a discontinuous reception (DRX) cycle, wherein the monitoring includes monitoring for a first WUS in a first CORESET and monitoring for a second WUS in a second CORESET;
   receiving, from the base station, the WUS in at least one of the multiple CORESETs during a wake-up signal occasion prior to an on-duration of the DRX cycle; and
   transmitting a sounding reference signal (SRS) based on the WUS received in the at least one of the multiple CORESETs, wherein the WUS causes the UE to enter an awake state during the on-duration of the DRX cycle, and the SRS is transmitted during the on-duration of the DRX cycle and in an active bandwidth part (BWP).

2. The method of claim 1, further comprising:
   receiving a Channel State Information-Reference Signal (CSI-RS) based on the WUS during the on-duration of the DRX cycle; and
   sending a CSI report to the base station based on the WUS, wherein the UE receives data based on the CSI report.

3. The method of claim 2, wherein the WUS is received on a first BWP bandwidth part (BWP) and the CSI-RS is received on a second BWP, and wherein the WUS comprises an uplink grant triggering a BWP configuration switch and reception of the CSI-RS is spaced from the WUS by a CSI offset.

4. The method of claim 2, wherein the WUS is received on a first BWP and the CSI-RS or the SRS is respectively received or transmitted on a second BWP, the WUS comprises a downlink assignment without corresponding downlink data, and the WUS triggers a BWP configuration switch.

5. The method of claim 4, further comprising:
   receiving a CSI-Reference Signal (CSI-RS) trigger for reception of the CSI-RS within a same slot as the CSI-RS trigger, wherein the CSI-RS trigger is received on the second BWP and is spaced from the WUS by a slot offset for BWP configuration transition.

6. The method of claim 4, further comprising:
   receiving a CSI-Reference Signal (CSI-RS) trigger for reception of the CSI-RS on the second BWP, wherein the CSI-RS trigger is spaced from the WUS by a slot offset sufficient for BWP configuration transition, and wherein the reception of the CSI-RS is spaced from the CSI-RS trigger by at least a CSI trigger offset.

7. The method of claim 1, wherein the WUS is received on a first BWP and the SRS is transmitted on a second BWP.

8. The method of claim 1, wherein the UE transmits the SRS to the base station based on the WUS.

9. The method of claim 1, wherein the WUS is received during the wake-up signal occasion prior to the on-duration of the DRX cycle, wherein the WUS is comprised in at least one of a control channel or another reference signal.

10. The method of claim 9, wherein the WUS is received on a first BWP during the wake-up signal occasion prior to the on-duration of the DRX cycle, and the SRS is transmitted on a second BWP during the on-duration of the DRX cycle.

11. The method of claim 10, wherein the first BWP has a preconfigured relationship to the second BWP.

12. The method of claim 1, further comprising:
decoding the first WUS and the second WUS to determine the first WUS and the second WUS comprise WUS information that is not inconsistent.

13. The method of claim 1, wherein the first WUS and the second WUS in the multiple CORESETs comprise WUS information that is not inconsistent.

14. An apparatus for wireless communication at a User Equipment (UE), comprising:
at least one memory; and
at least one processor coupled to the at least one memory and configured to cause the UE to:
monitor for a wake-up signal (WUS) from a base station on resources associated with multiple control resource sets (CORESETs), including to monitor for the WUS while performing a discontinuous reception (DRX) cycle, wherein to monitor for the WUS includes monitor for a first WUS in a first CORESET and monitor for a second WUS in a second CORESET;
receive, from the base station, the WUS in at least one of the multiple CORESETs during a wake-up signal occasion prior to an on-duration of the DRX cycle; and
transmit a sounding reference signal (SRS) based on the WUS received in the at least one of the multiple CORESETs, wherein the WUS causes the UE to enter an awake state during the on-duration of the DRX cycle, and the SRS is transmitted during the on-duration of the DRX cycle and in an active bandwidth part (BWP).

15. A method of wireless communication at a base station, comprising:
transmitting a wake-up signal (WUS) in multiple control resource sets (CORESETs) to a User Equipment (UE) performing a discontinuous reception (DRX) cycle, the WUS including a first instance of the WUS transmitted in a first CORESET and a second instance of the WUS transmitted in a second CORESET; and
receiving a sounding reference signal (SRS) based on the WUS, wherein the WUS indicates for the UE to enter an awake state during an on-duration of the DRX cycle, and the SRS is received during the on-duration of the DRX cycle and in an active bandwidth part (BWP).

16. The method of claim 15, further comprising:
transmitting a Channel State Information-Reference Signal (CSI-RS) to the UE based on the WUS during the on-duration of the DRX cycle;
receiving a CSI report from the UE based on the WUS; and
transmitting data based on the CSI report.

17. The method of claim 16, wherein the WUS is transmitted on a first BWP and the CSI-RS is transmitted on a second BWP, and wherein the WUS comprises an uplink grant triggering a BWP configuration switch and transmission of the CSI-RS is spaced from the WUS by a CSI offset.

18. The method of claim 16, wherein the WUS is transmitted on a first BWP and the SRS or the CSI-RS is respectively received or transmitted on a second BWP, the WUS comprising a downlink assignment without corresponding downlink data, and the WUS triggering a BWP configuration switch.

19. The method of claim 18, further comprising:
transmitting a CSI-RS trigger for reception of the CSI-RS at the UE within a same slot as the CSI-RS trigger, wherein the CSI-RS trigger is transmitted on the second BWP and is spaced from the WUS by a slot offset for BWP configuration transition.

20. The method of claim 18, further comprising:
transmitting a CSI-RS trigger for transmission of the CSI-RS on the second BWP, wherein the CSI-RS trigger is spaced from the WUS by a slot offset sufficient for BWP configuration transition, and wherein the transmission of the CSI-RS is spaced from the CSI-RS trigger by at least a CSI trigger offset.

21. The method of claim 15, wherein the WUS is transmitted on a first BWP and the SRS is transmitted on a second BWP.

22. The method of claim 15, wherein the base station receives the SRS from the UE based on the WUS.

23. The method of claim 15, wherein the WUS is transmitted during a wake-up signal occasion prior to the on-duration of the DRX cycle, wherein the WUS is comprised in at least one of a control channel or another reference signal.

24. The method of claim 23, wherein during the on-duration of the DRX cycle, the base station transmits a trigger to receive the SRS within a same slot as the trigger.

25. The method of claim 23, wherein the base station further transmits a Periodic Tracking Reference Signal (P-TRS) during the wake-up signal occasion prior to the on-duration of the DRX cycle, and wherein the WUS transmitted during the wake-up signal occasion is comprised in the control channel.

26. The method of claim 23, wherein the WUS is transmitted on a first BWP during the wake-up signal occasion prior to the on-duration of the DRX cycle, and the SRS is transmitted on a second BWP during the on-duration of the DRX cycle.

27. The method of claim 23, wherein the base station transmits a Periodic Channel State Information Reference Signal (P-CSI-RS) during the wake-up signal occasion prior to the on-duration of the DRX cycle.

28. An apparatus for wireless communication at a base station, comprising:
at least one memory; and
at least one processor coupled to the at least one memory and configured to cause the base station to:
transmit a wake-up signal (WUS) in multiple control resource sets (CORESETs) to a User Equipment (UE) performing a discontinuous reception (DRX) cycle, the WUS including a first instance of the WUS transmitted in a first CORESET and a second instance of the WUS transmitted in a second CORESET; and
receive a sounding reference signal (SRS) based on the WUS, wherein the WUS indicates for the UE to enter an awake state during an on-duration of the DRX cycle, and the SRS is received during the on-duration of the DRX cycle and in an active bandwidth part (BWP).

* * * * *